US008971032B2

(12) United States Patent
Griffin et al.

(10) Patent No.: US 8,971,032 B2
(45) Date of Patent: Mar. 3, 2015

(54) SUPPORT FOR A FLEXIBLE DISPLAY

(71) Applicant: Research In Motion Limited, Waterloo (CA)

(72) Inventors: Jason Tyler Griffin, Kitchener (CA); Martin Philip Riddiford, London (GB); Daniel Jordan Kayser, London (GB)

(73) Assignee: BlackBerry Limited, Waterloo, Ontario (CA)

( * ) Notice: Subject to any disclaimer, the term of this patent is extended or adjusted under 35 U.S.C. 154(b) by 12 days.

(21) Appl. No.: 13/667,762

(22) Filed: Nov. 2, 2012

(65) Prior Publication Data

US 2014/0126133 A1 May 8, 2014

(51) Int. Cl.
*H05K 5/02* (2006.01)

(52) U.S. Cl.
USPC .............. 361/679.27; 361/679.01; 361/679.3; 345/156

(58) Field of Classification Search
CPC ................................ G06F 1/1616; H05K 5/02
USPC ............. 361/679.27, 679.02, 679.3; 345/156
See application file for complete search history.

(56) References Cited

U.S. PATENT DOCUMENTS

| 2,303,941 | A | | 12/1942 | Lehman |
| 3,680,927 | A | | 8/1972 | Neureuther |
| 4,393,542 | A | | 7/1983 | Martinez |
| 5,734,513 | A | * | 3/1998 | Wang et al. .................... 359/742 |
| 5,949,643 | A | * | 9/1999 | Batio ....................... 361/679.27 |
| 6,107,988 | A | | 8/2000 | Phillipps |
| 6,223,393 | B1 | | 5/2001 | Knopf |
| 6,377,324 | B1 | * | 4/2002 | Katsura ........................... 349/58 |
| 6,577,496 | B1 | * | 6/2003 | Gioscia et al. ............. 361/679.3 |
| 6,628,244 | B1 | * | 9/2003 | Hirosawa et al. ............... 345/2.3 |
| 7,324,093 | B1 | * | 1/2008 | Gettemy et al. ............... 345/173 |
| 7,433,179 | B2 | * | 10/2008 | Hisano et al. ............. 361/679.27 |
| 7,565,720 | B1 | * | 7/2009 | Ligtenberg et al. ............. 16/366 |
| 7,777,415 | B2 | * | 8/2010 | Yang ............................. 313/512 |
| 7,880,688 | B2 | * | 2/2011 | Silverbrook ................... 345/1.3 |

(Continued)

FOREIGN PATENT DOCUMENTS

EP 2421231 2/2012

OTHER PUBLICATIONS

European Patent Office, "Extended European Search Report", issued in connection with EP patent application No. 12191050.9, issued Apr. 4, 2013 (9 pages).
European Patent Office, "Extended European Search Report", issued in connection with EP patent application No. 12191052.5, issued Mar. 14, 2013 (6 pages).
European Patent Office, "Extended European Search Report", issued in connection with EP patent application No. 12191051.7, issued Apr. 24, 2013 (9 pages).

(Continued)

*Primary Examiner* — Jinhee Lee
*Assistant Examiner* — Rashen E Morrison
(74) *Attorney, Agent, or Firm* — Hanley, Flight & Zimmerman, LLC

(57) ABSTRACT

A device includes: a housing having a first component and a second component coupled to one another by a pivot member and movable relative to one another between an open position in which the first component and the second component are in the same plane and a folded position; a first slider slidably received in the first component and a second slider slidably received in the second component, the first slider and the second slider being movable toward the pivot member when the first component and the second component move from the open position to the folded position; and a flexible membrane coupled to the first slider, the second slider and the pivot member; wherein, in the folded position, the flexible membrane is located between the first component and the second component.

10 Claims, 46 Drawing Sheets

(56) References Cited

U.S. PATENT DOCUMENTS

| | | |
|---|---|---|
| 8,125,759 B2 * | 2/2012 | Fukuma et al. ............... 361/260 |
| 8,228,667 B2 * | 7/2012 | Ma ........................... 361/679.01 |
| 8,271,047 B2 * | 9/2012 | Kim et al. .................... 455/566 |
| 8,369,075 B2 * | 2/2013 | Huang ..................... 361/679.21 |
| 8,605,421 B2 * | 12/2013 | Verschoor et al. ......... 361/679.3 |
| 8,624,844 B2 * | 1/2014 | Behar et al. ................... 345/169 |
| 8,662,731 B2 * | 3/2014 | Wang et al. .................. 362/632 |
| 8,713,759 B2 | 5/2014 | Cai |
| 2006/0146488 A1 * | 7/2006 | Kimmel ........................ 361/681 |
| 2008/0170043 A1 | 7/2008 | Soss et al. |
| 2010/0152644 A1 | 6/2010 | Pesach et al. |
| 2010/0232100 A1 | 9/2010 | Fukuma et al. |
| 2011/0286157 A1 | 11/2011 | Ma |
| 2012/0044620 A1 * | 2/2012 | Song et al. ............... 361/679.01 |
| 2012/0264489 A1 * | 10/2012 | Choi et al. .................... 455/566 |
| 2013/0219663 A1 | 8/2013 | Cai |
| 2014/0004548 A1 | 1/2014 | Gordon et al. |
| 2014/0126133 A1 | 5/2014 | Griffin et al. |
| 2014/0226275 A1 | 8/2014 | Ko et al. |

OTHER PUBLICATIONS

United States Patent and Trademark Office, "Non-Final Office Action," issued in connection with U.S. Appl. No. 13/667,780, Jul. 8, 2014, 26 pages.

European Patent Office, "Examination Report", issued in connection with EP patent application No. 12191050.9, issued Feb. 14, 2014 (6 pages).

European Patent Office, "Examination Report", issued in connection with EP patent application No. 12191052.5, issued May 19, 2014 (4 pages).

United States Patent and Trademark Office, "Non-final Office Action," issued in connection with U.S. Appl. No. 13/667,719, Aug. 29, 2014, 47 pages.

European Patent Office, "Communication pursuant to Article 94(3) EPC," issued in connection with Application No. 12191050.9, Aug. 4, 2014, 5 pages.

* cited by examiner

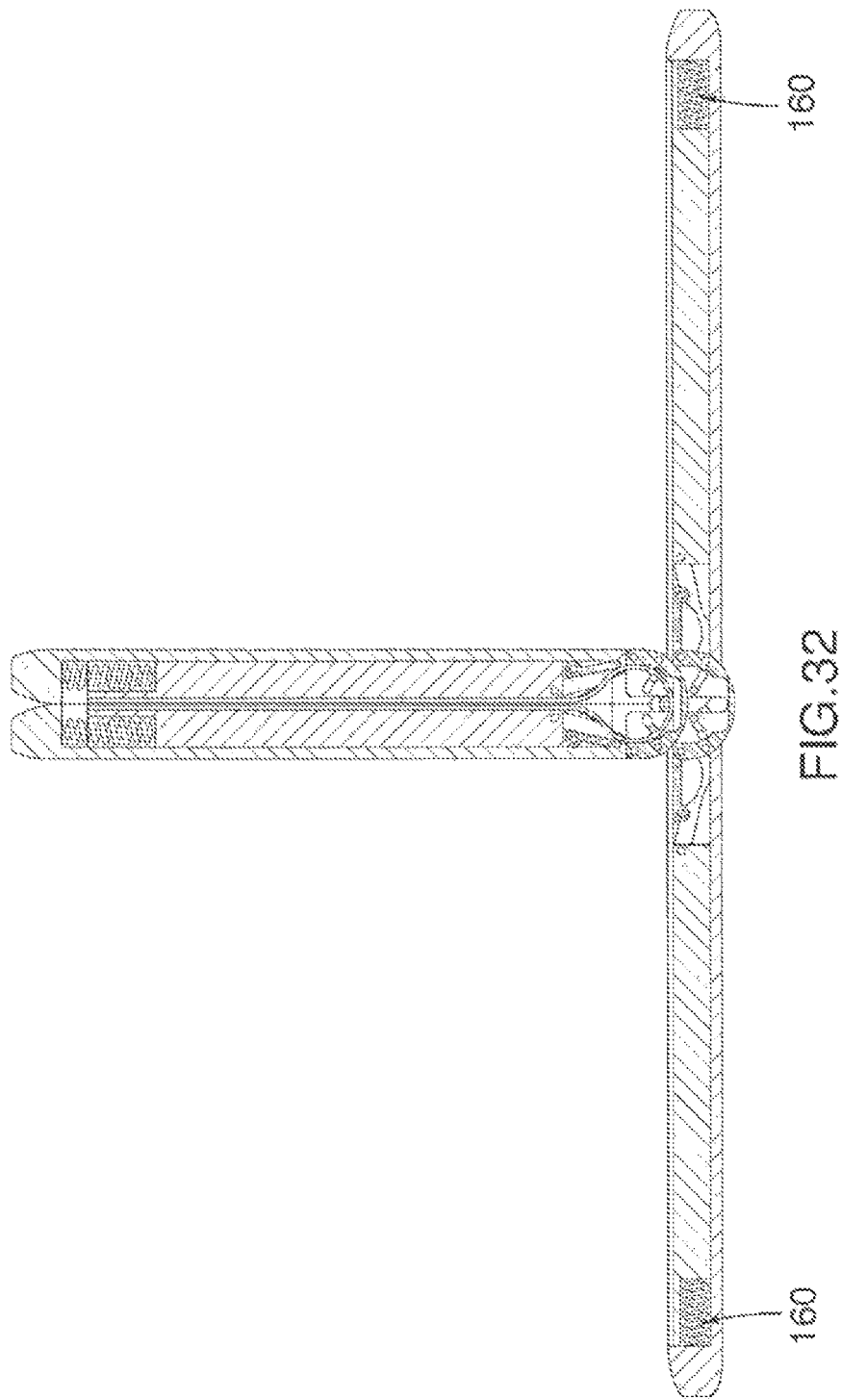

SUPPORT FOR A FLEXIBLE DISPLAY

TECHNICAL FIELD

The present application relates to mechanical supports for flexible membranes including flexible displays.

BACKGROUND DISCUSSION

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), tablets and laptop computers with wireless 802.11 or Bluetooth capabilities.

Portable electronic devices such as PDAs or smart telephones are generally intended for handheld use and ease of portability. Portable electronic devices may include flexible displays.

BRIEF DESCRIPTION OF THE DRAWINGS

Embodiments of the present application will now be described, by way of example only, with reference to the attached Figures, wherein:

FIG. 32 is a side sectional view of another example portable electronic device in the starting position and the folded position;

DETAILED DESCRIPTION

Figure 1:
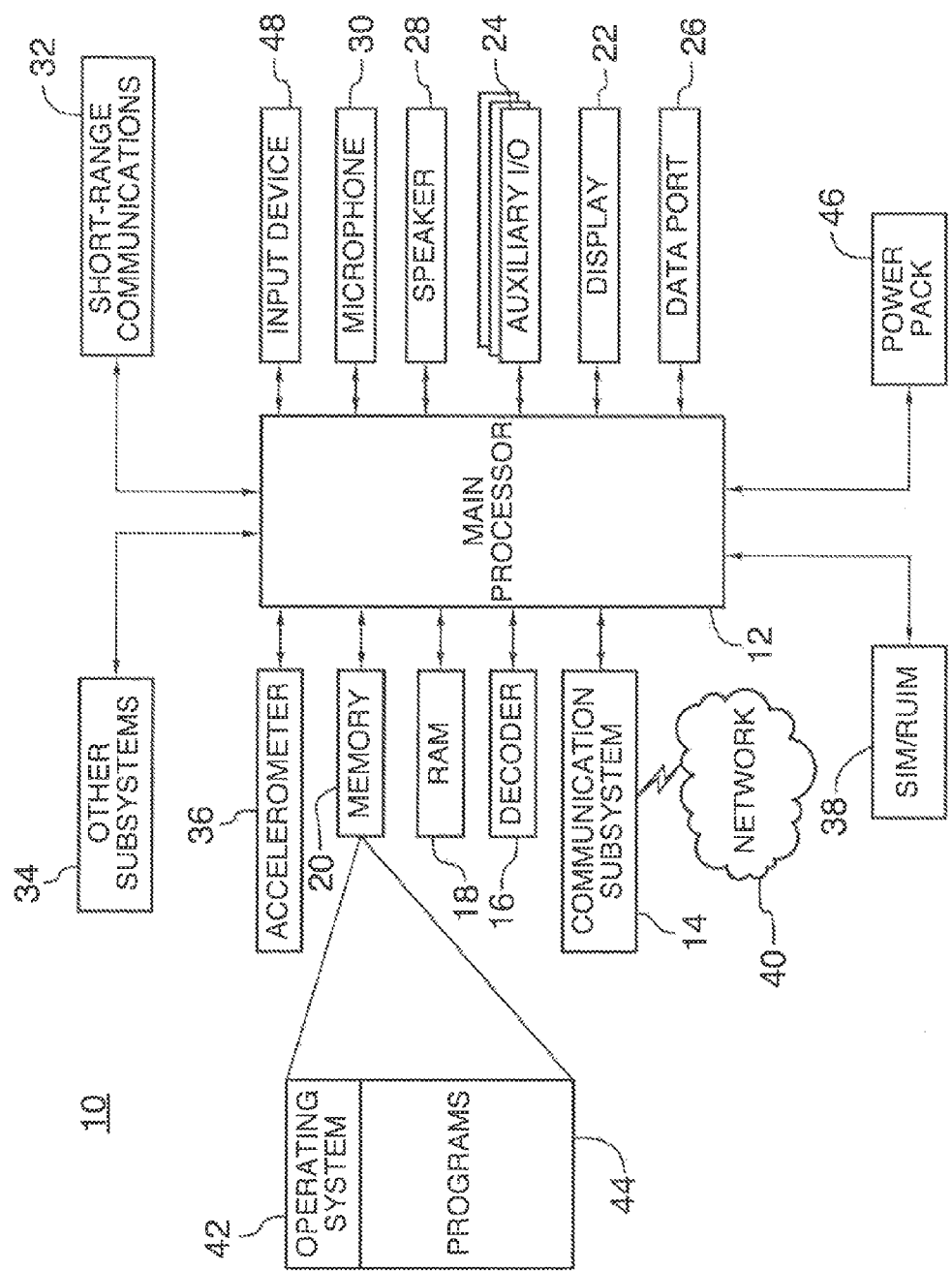
FIG. 1 is a simplified block diagram of components including internal components of a portable electronic device.

The following describes mechanisms to support a flexible display. Some flexible displays are thin and may be damaged when bent or folded beyond a limit. Many of the mechanisms described herein may help avoid damage to the flexible display during bending.

In an aspect of the present disclosure, there is provided a device comprising: a housing having a first component and a second component coupled to one another by a pivot member and movable relative to one another between an open position in which the first component and the second component are in the same plane and a folded position; a first slider slidably received in the first component and a second slider slidably received in the second component, the first slider and the second slider being movable toward the pivot member when the first component and the second component move from the open position to the folded position; and a flexible membrane coupled to the first slider, the second slider and the pivot member; wherein, in the folded position, the flexible membrane is located between the first component and the second component.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to portable electronic devices including: mobile, perhaps handheld, wireless communication devices such as pagers, cellular phones, cellular smart-phones, wireless organizers, tablets, electronic readers, laptop computers, electronic maps or navigation devices, portable display screens, televisions, and personal digital assistants, for example. The portable electronic device may also be a portable electronic device without wireless communication capabilities, such as a handheld electronic game device, digital photograph album, monitor, digital camera, or other device. Some of the devices may be handheld, that is, sized and shaped to be held or carried in a human hand. In some embodiments, the capability of being folded may enhance the device's portability.

A block diagram of an example of a portable electronic device 10 is shown in FIG. 1. The portable electronic device 10 includes multiple components, such as a processor 12 that controls the overall operation of the portable electronic device 10. Communication functions, including data and voice communications, are performed through a communication subsystem 14. Data received by the portable electronic device 10 is decompressed and decrypted by a decoder 16. The communication subsystem 14 receives messages from and sends messages to a wireless network 40. The wireless network 40 may be any type of wireless network, including, but not limited to, data wireless networks, voice wireless networks, and networks that support both voice and data communications. A power pack 46, such as one or more rechargeable batteries powers the portable electronic device 10. Alternatively, a port to an external power supply may be used to power the portable electronic device 10.

The processor 12 interacts with other components, such as Random Access Memory (RAM) 18, memory 20, a display 22, an auxiliary input/output (I/O) subsystem 24, a data port 26, a speaker 28, a microphone 30, short-range communications 32, and other device subsystems 34. The processor 12 may interact with an orientation sensor such as an accelerometer 36 that may be utilized to detect direction of gravitational forces or gravity-induced reaction forces.

To identify a subscriber for network access, the portable electronic device 10 may use a Subscriber Identity Module or a Removable User Identity Module (SIM/RUIM) card 38 for communication with a network, such as the wireless network 40. Alternatively, user identification information may be programmed into the memory 20.

The portable electronic device 10 includes an operating system 42 and software programs or components 44 that are executed by the processor 12 and are typically stored in a persistent, updatable store such as the memory 20. Additional applications or programs may be loaded onto the portable electronic device 10 through the wireless network 40, the auxiliary I/O subsystem 24, the data port 26, the short-range communications subsystem 32, or any other suitable subsystem 34.

A received signal such as a text message, an e-mail message, or web page download is processed by the communication subsystem 14 and input to the processor 12. The processor 12 processes the received signal for output to the display 22 and/or to the auxiliary I/O subsystem 24. A subscriber may generate data items, for example e-mail messages, which may be transmitted over the wireless network 40 through the communication subsystem 14. For voice communications, the overall operation of the portable electronic device 10 is similar. The speaker 28 outputs audible information converted from electrical signals, and the microphone 30 converts audible information into electrical signals for processing. The display 22 may generate and present to a user an image, which may include a photographic image, a movie image, text, drawings or graphical information of any kind.

The processor 12 may further interact with an input device 48, which may be a keyboard, one or more buttons, a track pad or a track ball, for example. When the display 22 is a touch-sensitive display, the touch-sensitive display may operate as an input device. The touch-sensitive display may include a display with a touch-sensitive overlay connected to an electronic controller. The processor 12 interacts with the touch-sensitive overlay via the electronic controller. Information, such as text, characters, symbols, images, and other items that may be displayed on a portable electronic device, is displayed on the touch-sensitive display via the processor 12.

Figure 2:
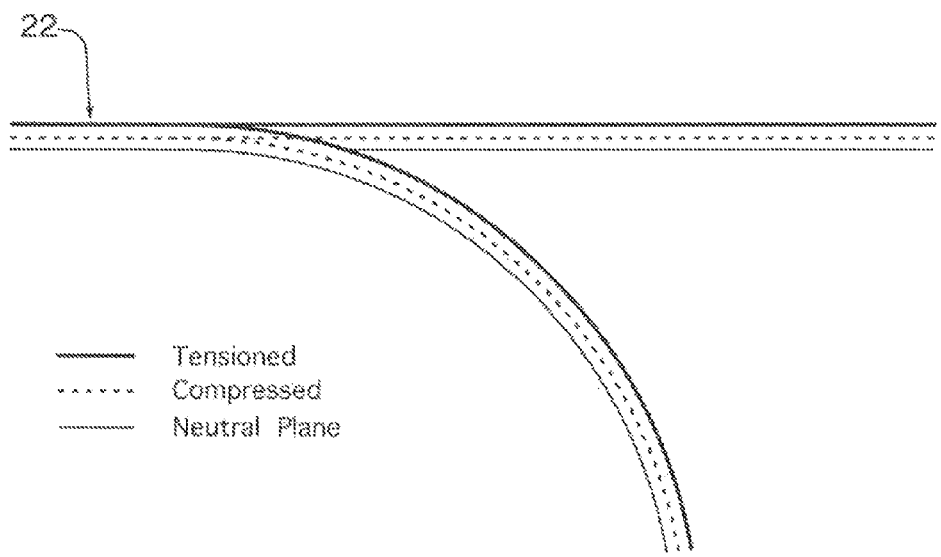
FIG. 2 is a side schematic view of a flexible display.

The display 22 is a flexible display. The display 22 is typically a flexible membrane, that is, a relatively thin apparatus in comparison to its length and width. The display 22 is a pliable structure that can flex or bend or fold. A flexible display may be extra thin or film-like, or may resemble a somewhat thicker layer or sheet. The technology by which the display generates an image may be any kind of image-generating technology, such as by light-emitting diodes, and may include technology not yet developed. When the display is a touch-sensitive flexible display, the touch-sensitive flexible display may be any suitable touch-sensitive display, such as a capacitive, resistive, infrared or inductive, for example. Referring also to FIG. 2, an example flexible display 22 is shown. The flexible display 22 may be foldable in one direction or both directions. When folded, one side of the screen is in compression and the opposite side of the screen is in tension. The plane of the flexible display that is neither compressed nor tensioned is referred to as a neutral plane. The amount that the flexible display is able to flex varies depending on the flexible display thickness and the materials used to manufacture the flexible display. In one example, a bend radius of the flexible display is 5 mm and a thickness of the display is 0.4 mm, which includes a thickness of an adhesive that is used to secure the flexible display to the portable electronic device 10. Other bend radii and thicknesses are possible. Generally speaking, folding of the display may be desirable for various reasons, but creasing (or bending beyond the tolerance of the bend radius) is undesirable and may cause damage to the display.

Figure 3:
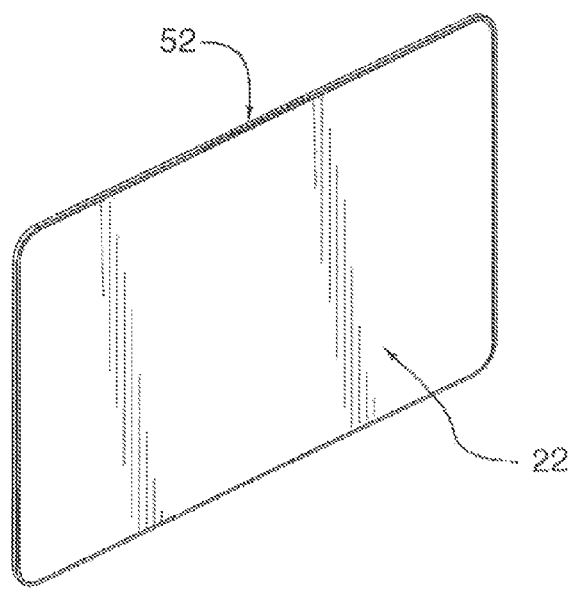
FIG. 3 is an isometric front view of an example portable electronic device including a support for a flexible display.
Figure 4A:
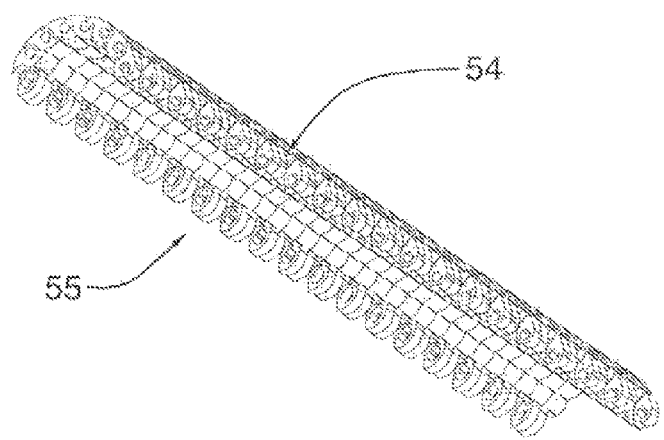
FIG. 4A is an isometric view of the support of FIG. 3.
Figure 4B:
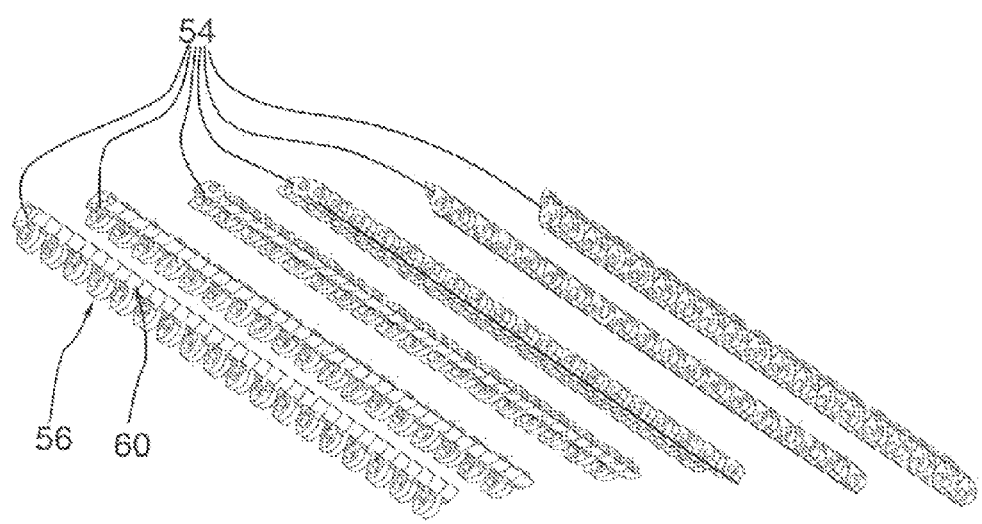
FIG. 4B is an exploded view of FIG. 4A.
Figure 5A:
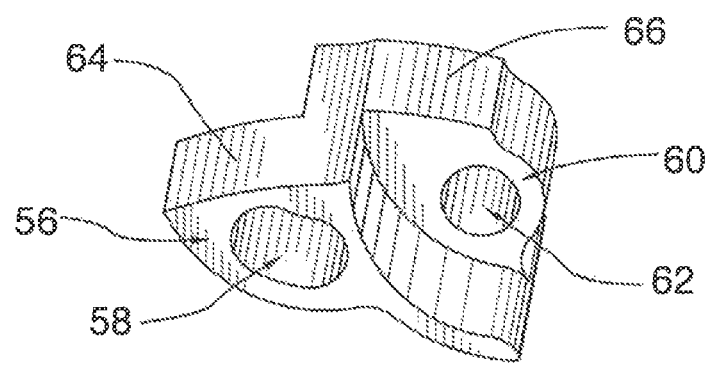
FIGS. 5A, 5B and 5C are isometric views of a portion of a hinge element of the support of FIG. 4A.
Figure 5B:
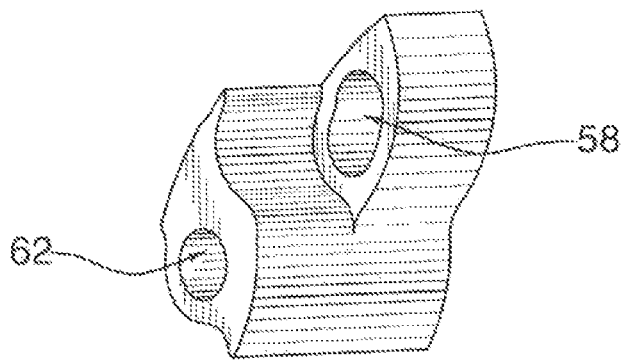
Figure 5C:
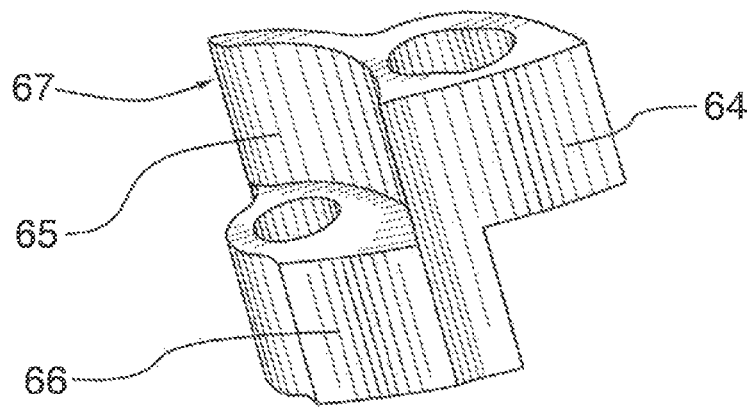

Referring to FIG. 3, an example portable electronic device 10 includes a flexible display 22 that is coupled to a support 52 by an adhesive (not shown) such as self-adhesive tape or glue or cement, for example; adhesive also includes, however, any kind of physical fastening agent. The adhesive may be positioned at one or more sites between the display 22 and the support 52. In the embodiment of FIG. 3, the support 52 limits bending to one direction only. Two elements are coupled (or physically coupled) to one another when movement of one element affects movement of the other element. The two elements may be directly coupled to one another or may be coupled to one another through one or more other elements. The support 52 is movable between an open position, which is shown in FIG. 3, and a screen-external folded position, in which the flexible display 22 is on an outside of the folded support 52. The support 52 includes a plurality of hinge elements 54 that are coupled to one another by pins (not shown) to provide a hinge assembly 55, as shown in FIGS. 4A and 4B. The hinge elements 54 include a repeating pattern of first lugs 56 and second lugs 60, as shown. Referring also to FIGS. 5A, 5B and 5C, the first lugs 56 include slot-like openings 58 and the second lugs 60 include generally circular openings 62. When assembled, the flexible display 22 of the portable electronic device 10 is coupled to display-receiving surfaces 66 of the second lugs 60, which are located adjacent to surfaces 64 of the first lugs 56. The display-receiving surfaces 66 extend at least partway along a length of the hinge elements 54.

Figure 6:
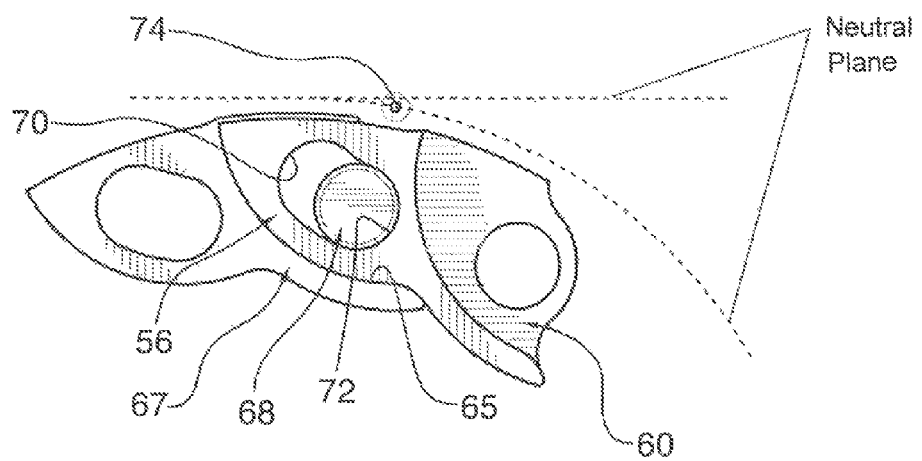
FIGS. 6, 7, 8 and 9 are end views of two hinge elements of the support of FIG. 4A.
Figure 7:
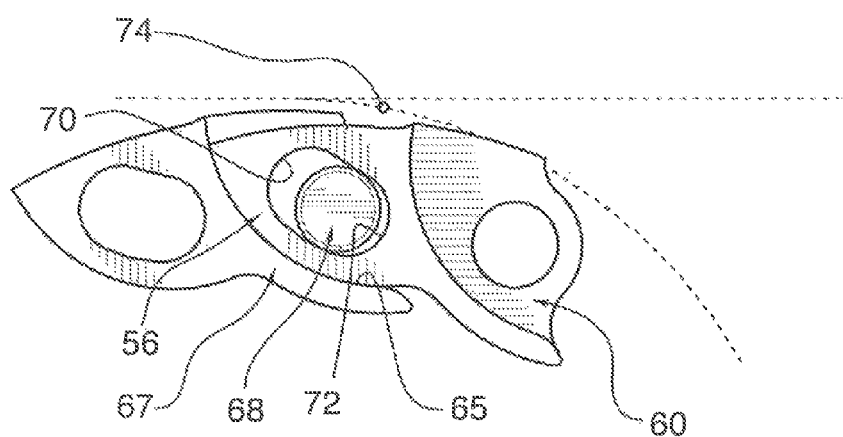
Figure 8:
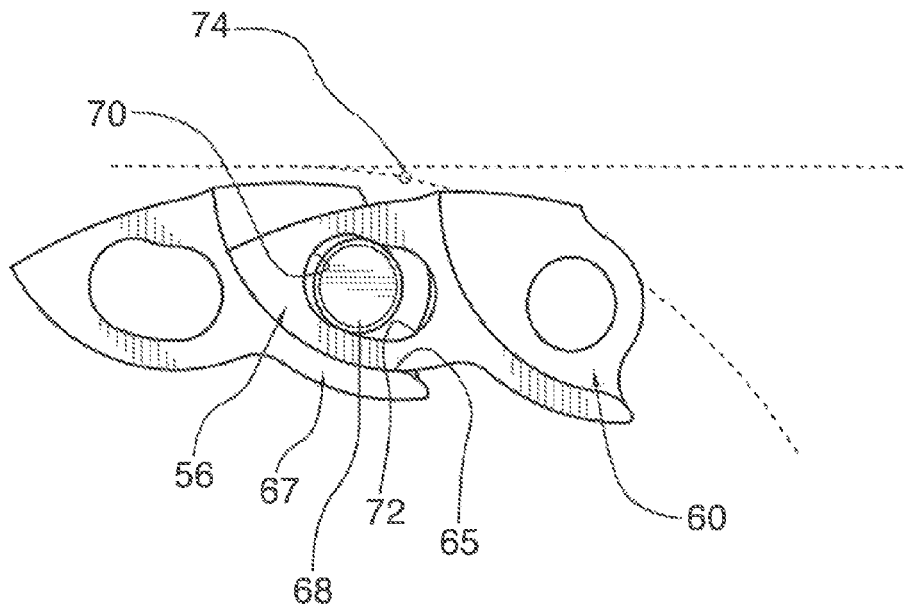
Figure 9:
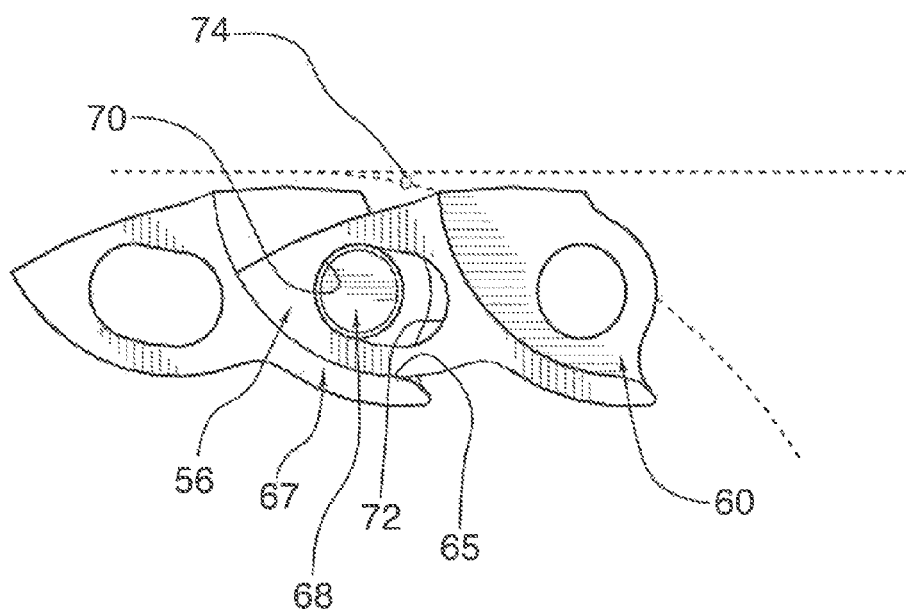

Referring to FIG. 6, the hinge elements 54 are shaped to nest together so that a pin 68 extending through the generally circular opening 62 of one hinge element 54 also passes through the slot-like opening 58 of an adjacent hinge element 54. Movement of the hinge elements 54 relative to one another is depicted in FIGS. 6 to 9. As shown, the pin 68 follows a path determined by the shape of the slot-like openings 58. The slot-like openings 58 and a surface 65, which is located on rib 67 adjacent to the second lug 60, function as a guide to control movement of a hinge element 54 relative to an adjacent hinge element between a first stop 70, located at one end of the slot-like opening 58, and a second stop 72, located at an opposite end of the slot-like opening 58.

As shown in FIGS. 6 to 9, movement of one hinge element 54 relative to an adjacent hinge element 54 occurs about a virtual pivot 74 so that a chord length is generally constant as the support moves between the open position and the screen internal folded position. By controlling the path of movement of one hinge element relative to an adjacent hinge element, the support 52 controls a bend radius of the flexible display 22 to protect the flexible display 22 from damage due to over-bending.

In the embodiment of FIGS. 3 to 9, electronics of the portable electronic device 10 may be provided in electrical communication with the processor 12 by cables. The cables that pass between non-flexible portions of the portable electronic device 10 may extend through passages provided in the hinge elements 54. Alternatively, electronics may be provided on a flexible printed circuit board (PCB) located below the flexible display 22. Alternatively, the electronics may be located at a non-flexing end of the portable electronic device 10.

Figure 10A:
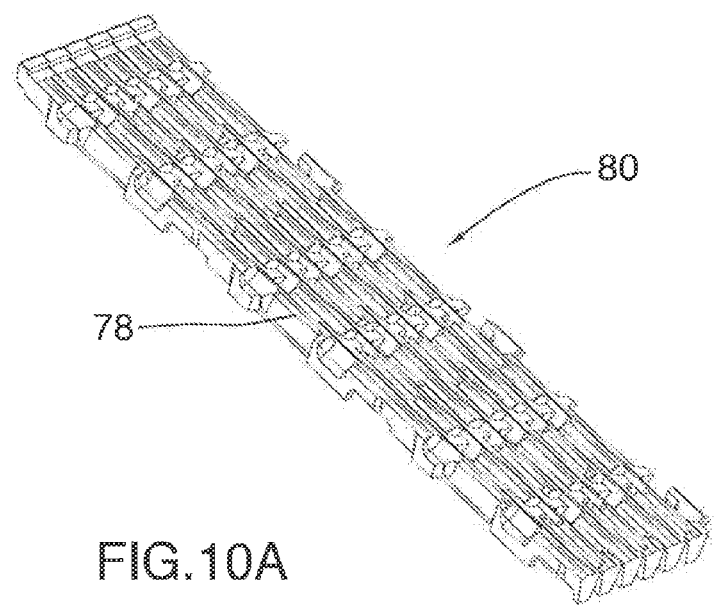
FIG. 10A is an isometric view of a portion of a screen-receiving side of a support of a flexible display according to another embodiment.
Figure 10B:
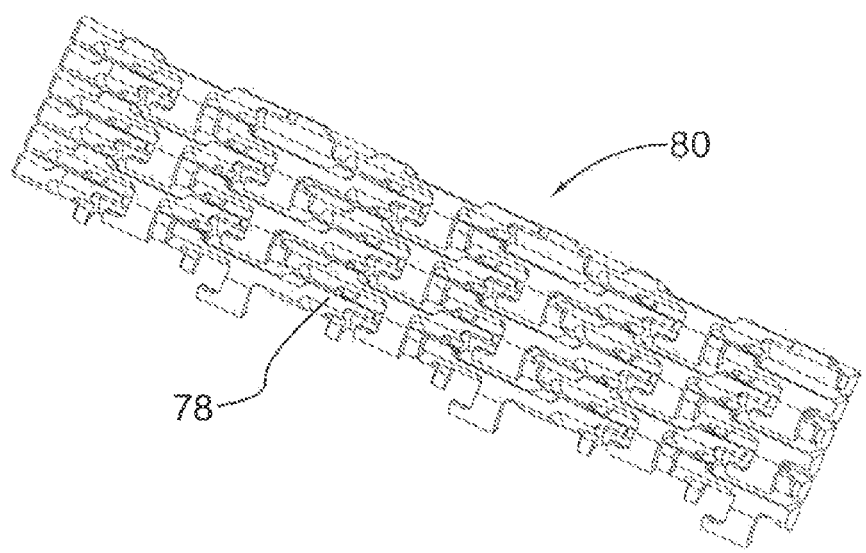
FIG. 10B is an isometric view of an opposite side of the support of FIG. 10A.
Figure 11:
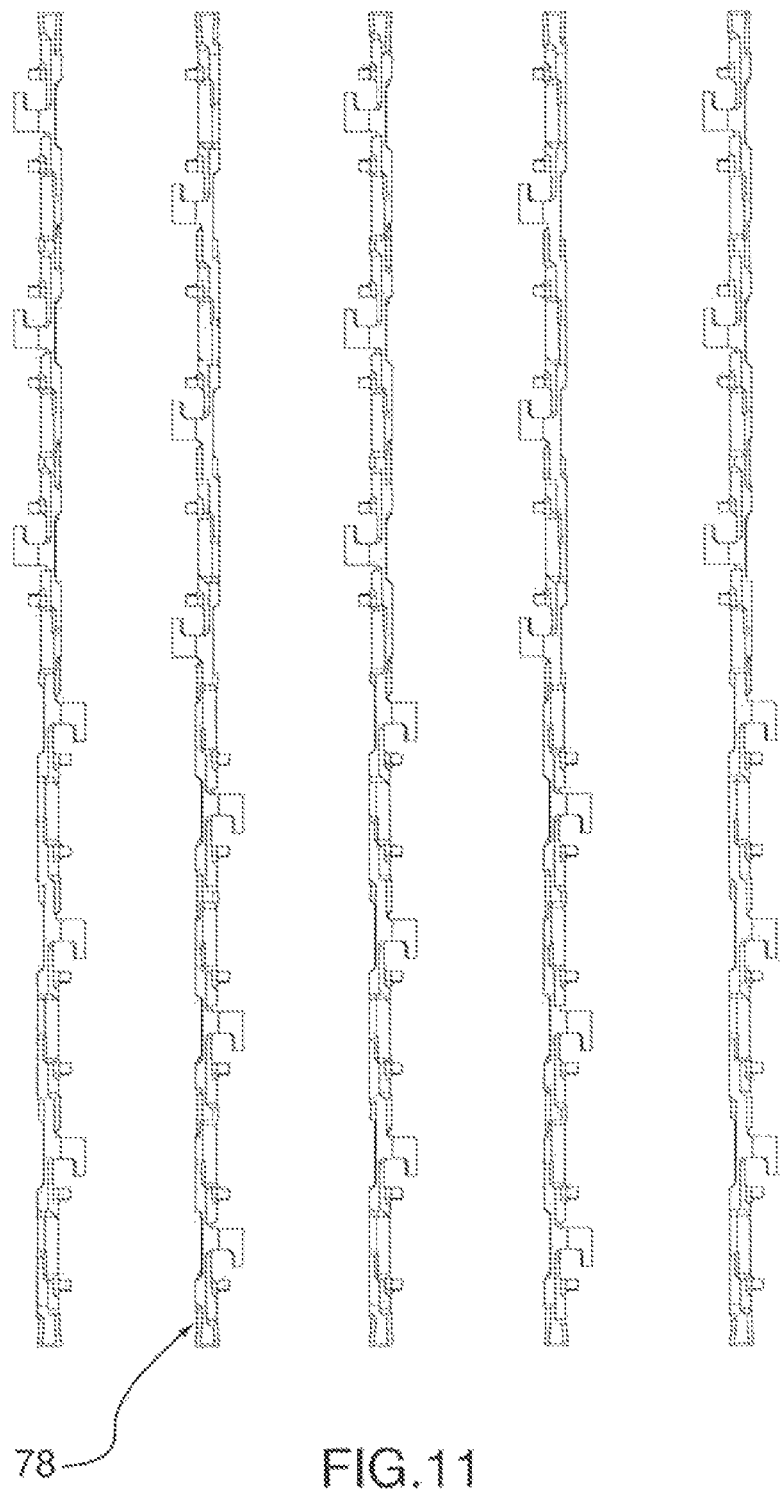
FIG. 11 is an exploded view of the support of FIGS. 10A and 10B.

Referring now to FIGS. 10A, 10B and 11, another example of a support 76 for the flexible display 22 is shown. The support 76 includes a plurality of hinge elements 78, which are shaped to couple to one another and provide a hinge assembly 80. In this embodiment, the support 76 facilitates bending in both directions. As shown in FIG. 11, the hinge elements 78 include the same features, however, the features are reversed over approximately half of the length of the hinge elements 78. In addition, the features are axially offset on every second hinge element 78 in order to facilitate mating of adjacent hinge elements 78.

Figure 12:
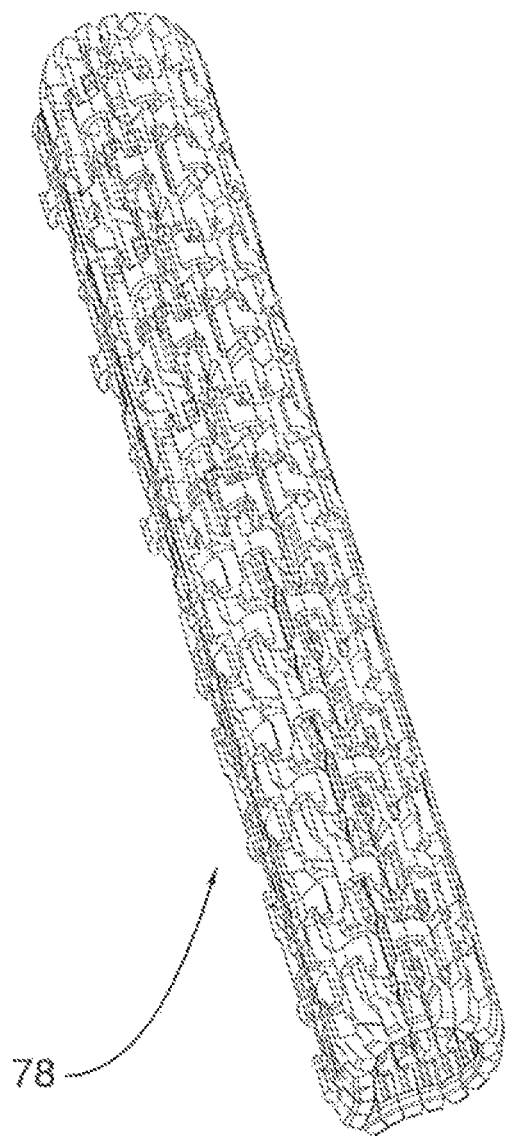
FIG. 12 is an isometric view of the support of FIGS. 10A and 10B in a screen internal folded position.
Figure 13:
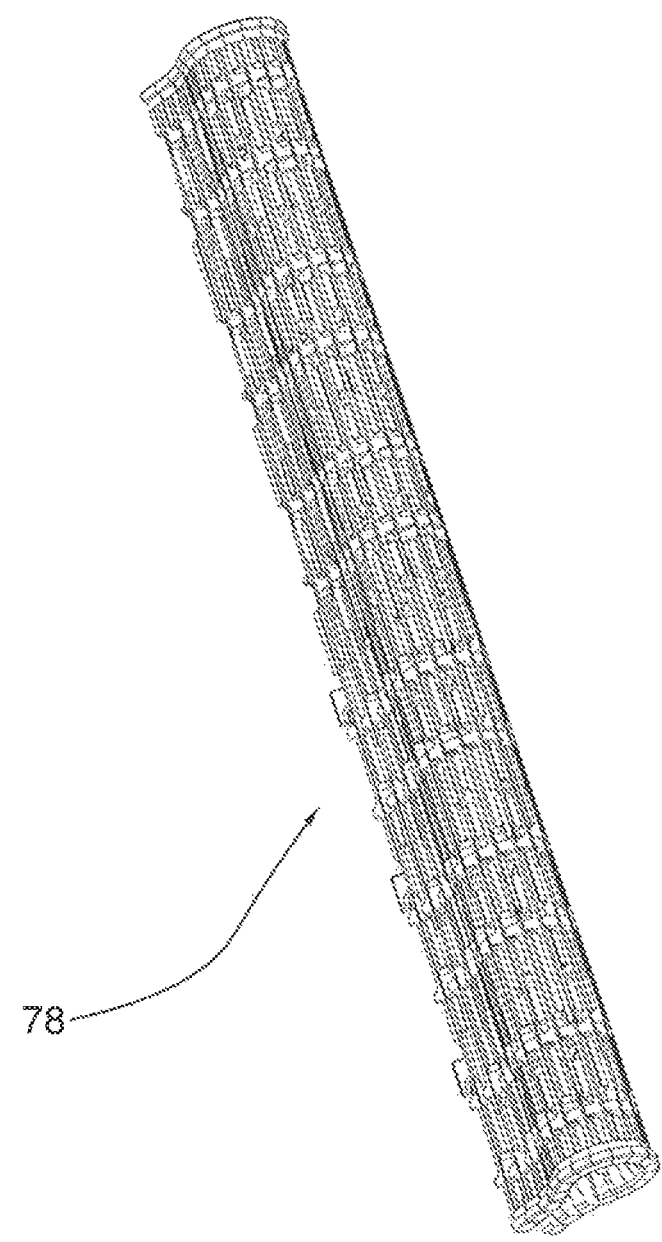
FIG. 13 is an isometric view of the support of FIGS. 10A and 10B in a screen external folded position.

The support 76 is movable between a starting position, in which the flexible display 22 is generally flat, as shown in FIGS. 10A and 10B, a screen internal folded position, which is shown in FIG. 12, and a screen external folded position, as shown in FIG. 13. The support 76 is limited from further bending beyond the positions shown in FIGS. 12 and 13 based on the geometry of the hinge elements 78. A greater or lesser amount of bending may be possible by modifying the structure of the hinge elements 78.

Figure 14A:
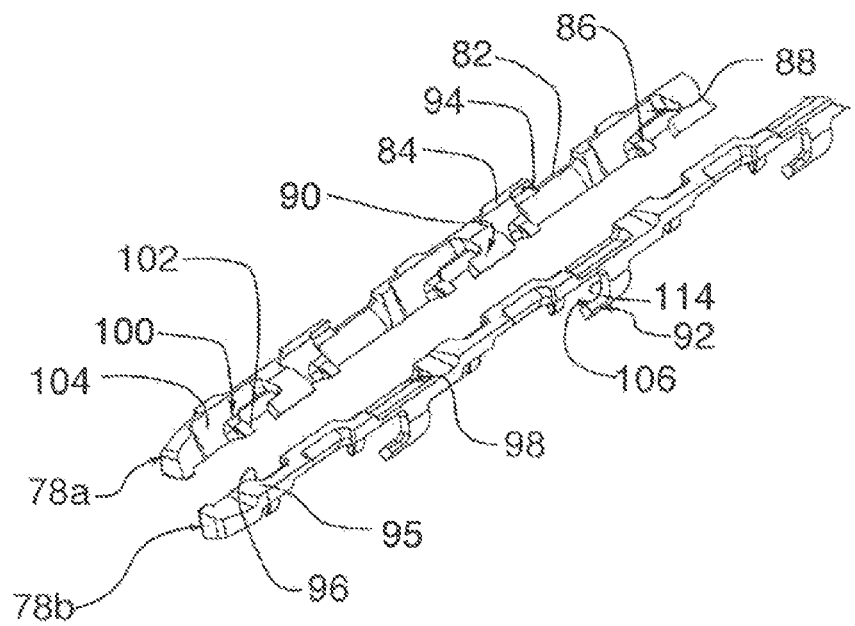
FIG. 14A is an isometric exploded view of portions of two adjacent hinge elements.
Figure 14B:
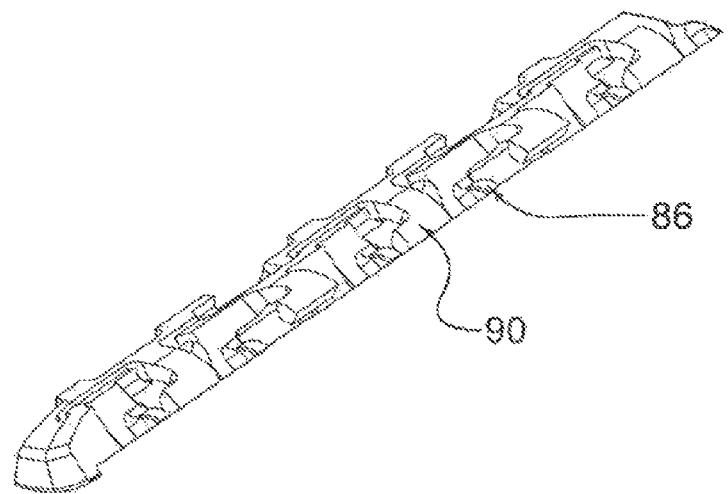
FIG. 14B is an isometric view of portions of two adjacent hinge elements when assembled.

Referring to FIGS. 14A and 14B, a first hinge element 78a is located adjacent to a second hinge element 78b. As shown, the features of the hinge elements 78 include a series of cutouts 82 that are located in a top surface 84 thereof. Pairs of curved projections 86 extend from a first side 88 of the first hinge element 78a at locations on either side of the cutouts 82.

Hook-shaped projections 90 also extend from the first side 88 near the top surface 84, as shown, and are regularly spaced with one hook-shaped projection 90 being located between each pair of adjacent cutouts 82. The hook-shaped projections 90 include an extension portion 92, which extends generally parallel to the length of the hinge element 78. When assembled, the extension portion 92 of the first hinge element 78a is generally aligned with a surface 94 of the first side 88 of the second hinge element 78b. A mating side 98 of the second hinge element 78b includes pairs of grooves 96 located on either side of the hook-shaped projections 90.

Figure 15A:
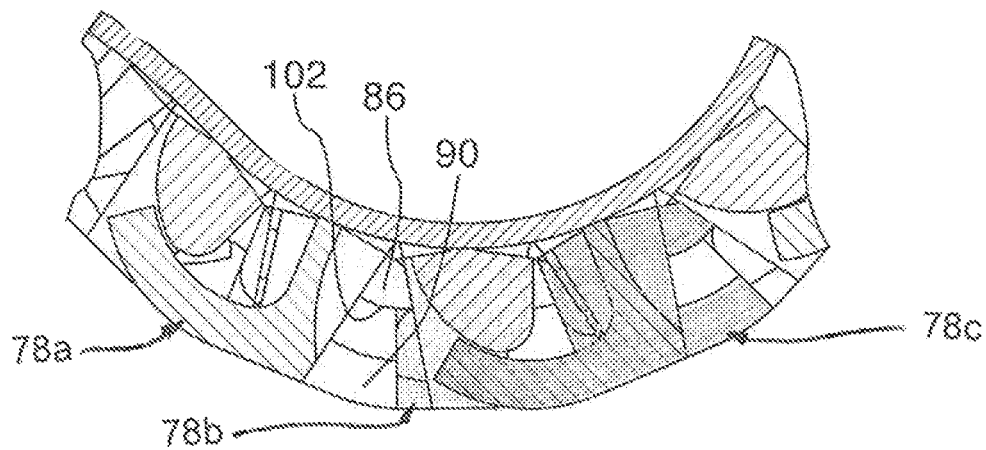
FIG. 15A is a sectional view of the support of FIGS. 10A and 10B between a screen internal folded position and a starting position.
Figure 15B:
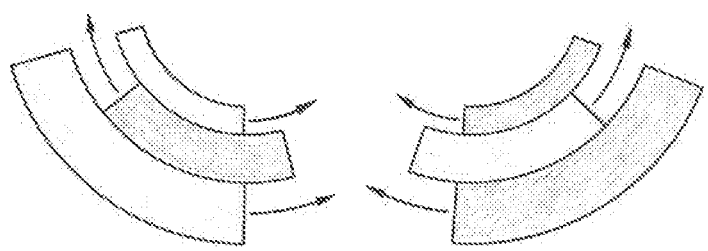
FIG. 15B is a schematic view depicting rotation of adjacent hinge elements about a virtual pivot.

Adjacent hinge elements 78 are shaped to nest together so that the curved projections 86 of the first hinge element 78a are aligned with the grooves 96 of the second hinge element 78b and the hook-shaped projections 90 of the first hinge element 78a are aligned with the cutouts 82 of the second hinge element 78b. Referring also to FIG. 15A, adjacent hinge elements are identified with reference numerals 78a, 78b and 78c and uniquely shaded in order to better identify the individual hinge elements for the purpose of description. As shown, the curved projections 86 and hook-shaped projections 90 function as a guide so that the hinge elements 78 may guide movement of adjacent hinge elements 78 along a path between a first stop 100, which includes a surface portion 104 of the first side 88 and a top surface 102 of the curved projection 86, and a second stop 106, which is an underside surface 114 of the extension portion 92 of the hook-shaped projection 90. The first stop 100 limits movement in a first direction and the second stop 106 limits movement in a second, opposite, direction. In general, the path of movement is defined by concave surfaces of the hook-shaped projections 90 and convex surfaces of the curved projections 86, as schematically shown in FIG. 15B.

Adjacent hinge elements 78 are assembled using a bayonet-type method. When ends of the hinge elements 78 are aligned, the hinge elements 78 are locked together but still able to rotate relative to one another. The flexible display may be adhered to each hinge element 78, which generally prevents sliding of the hinge elements 78 relative to one another so that the hinge assembly 80 may be maintained in an assembled position.

Figure 16A:
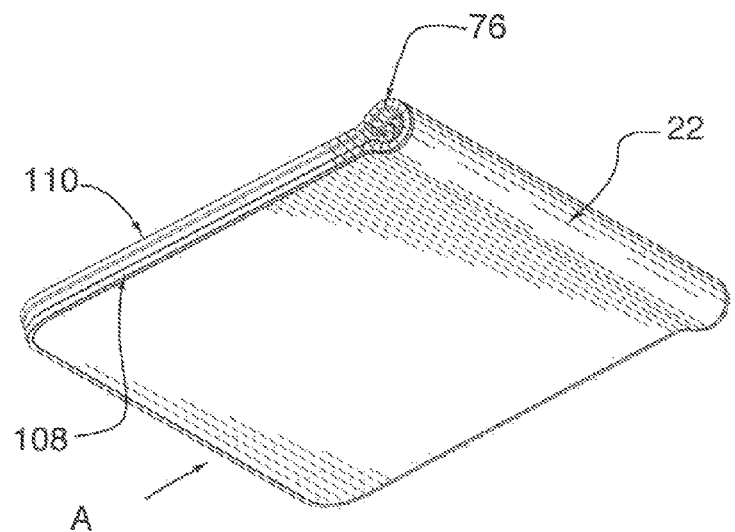
FIG. 16A is an isometric view of a portable electronic device in a screen external folded position.
Figure 16B:
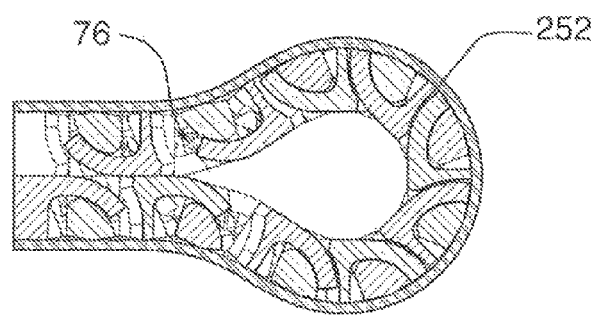
FIG. 16B is a section of the portable electronic device of FIG. 16A.
Figure 18A:
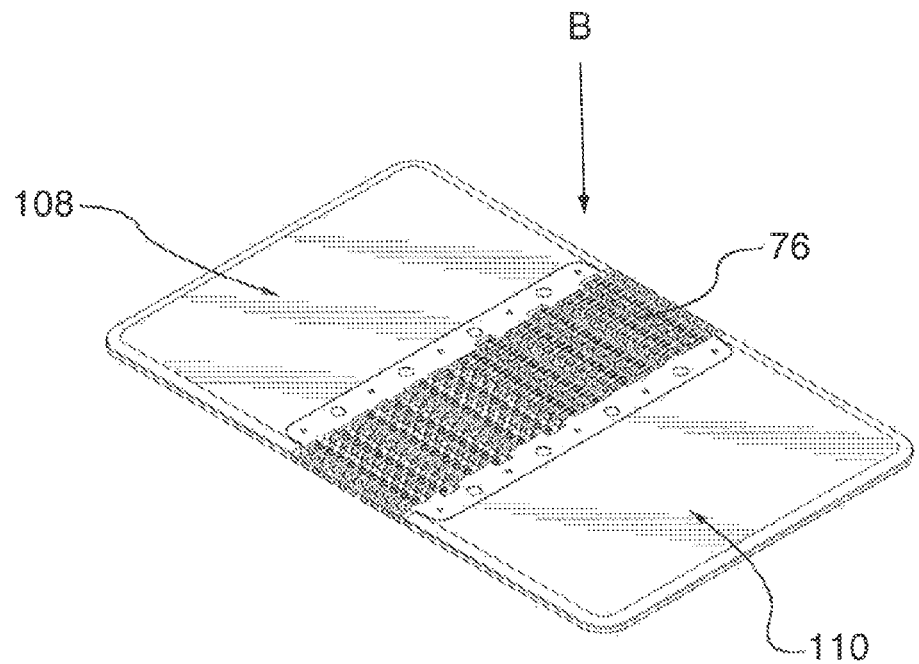
FIG. 18A is an isometric view of a portable electronic device in a starting position in which the flexible display is generally flat.
Figure 18B:
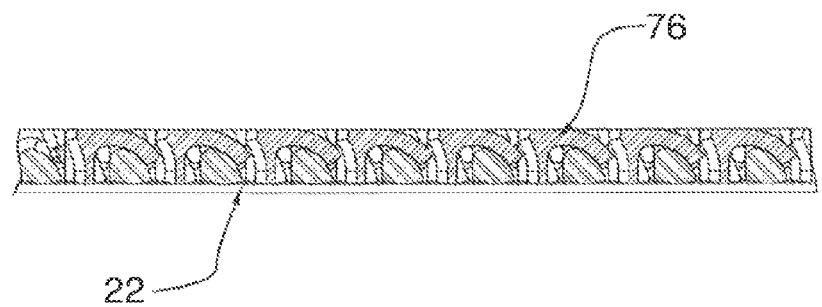
FIG. 18B is a section of the portable electronic device of FIG. 18A.
Figure 20A:
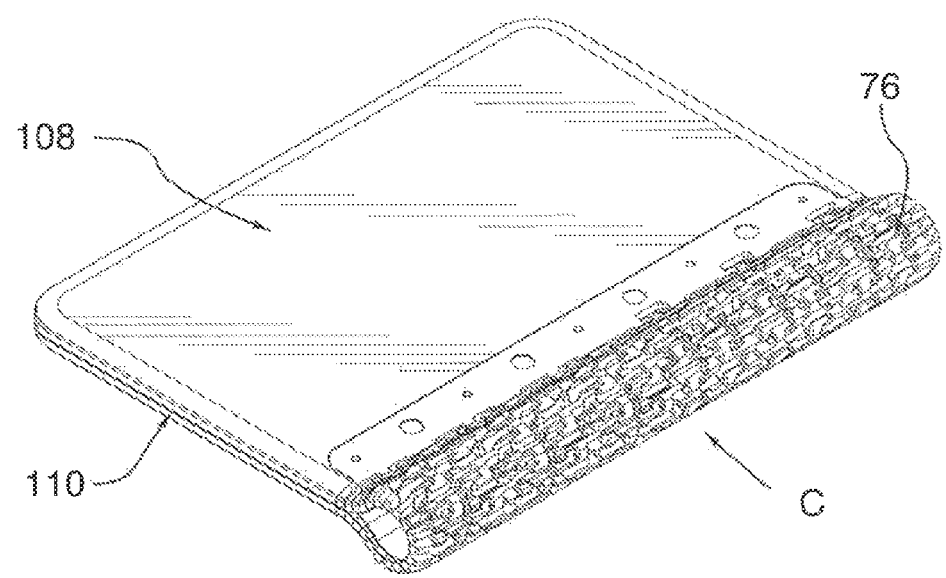
FIG. 20A is an isometric view of a portable electronic device in a screen internal folded position.
Figure 20B:
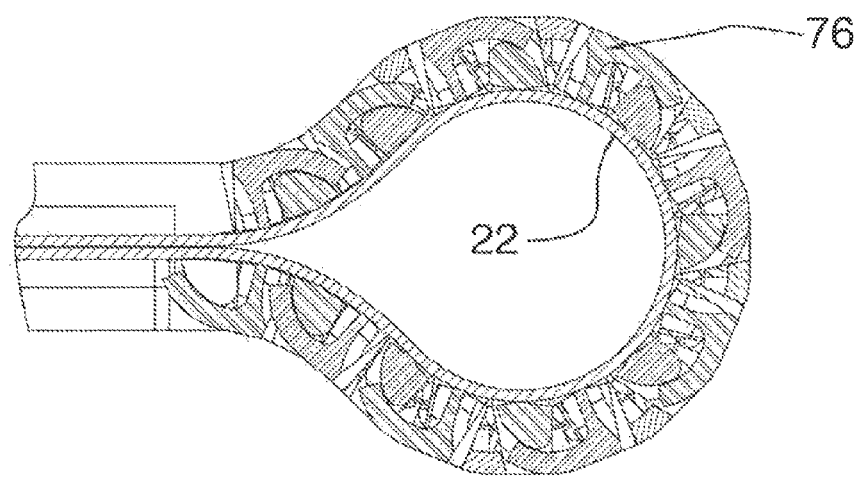
FIG. 20B is a section of the portable electronic device of FIG. 20A.

An example of a portable electronic device 10 including the support 76 is shown in the screen external folded position, in which the flexible display 22 is exposed, in FIGS. 16A and 16B. The support 76 is coupled between a first housing 108 and a second housing 110 and the flexible display 22 is coupled to the first housing 108, the support 76 and the second housing 110. Referring to FIGS. 18A and 18B, the portable electronic device 10 of FIGS. 16A and 16B is shown in a starting position in which the support 76 and the flexible display 22 are generally flat. Referring also to FIGS. 20A and 20B, the portable electronic device 10 of FIGS. 16A and 16B is shown in a screen internal folded position, in which the flexible display 22 is hidden.

Figure 17:
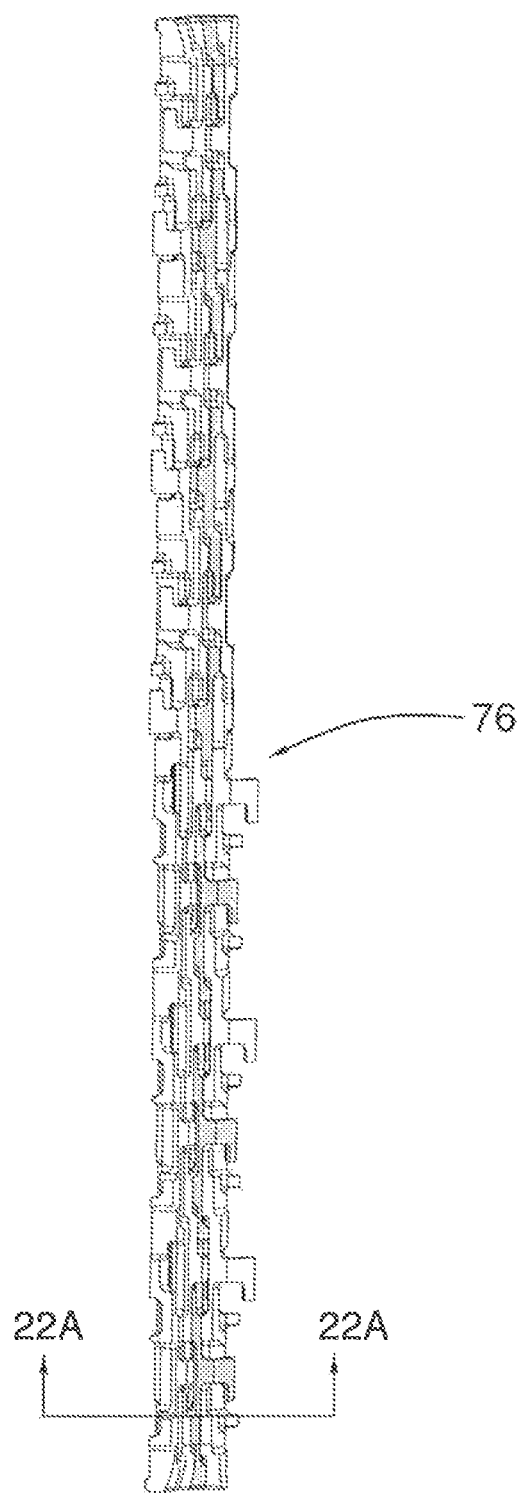
FIG. 17 is a view on A of FIG. 16A showing a portion of the support.
Figure 19:
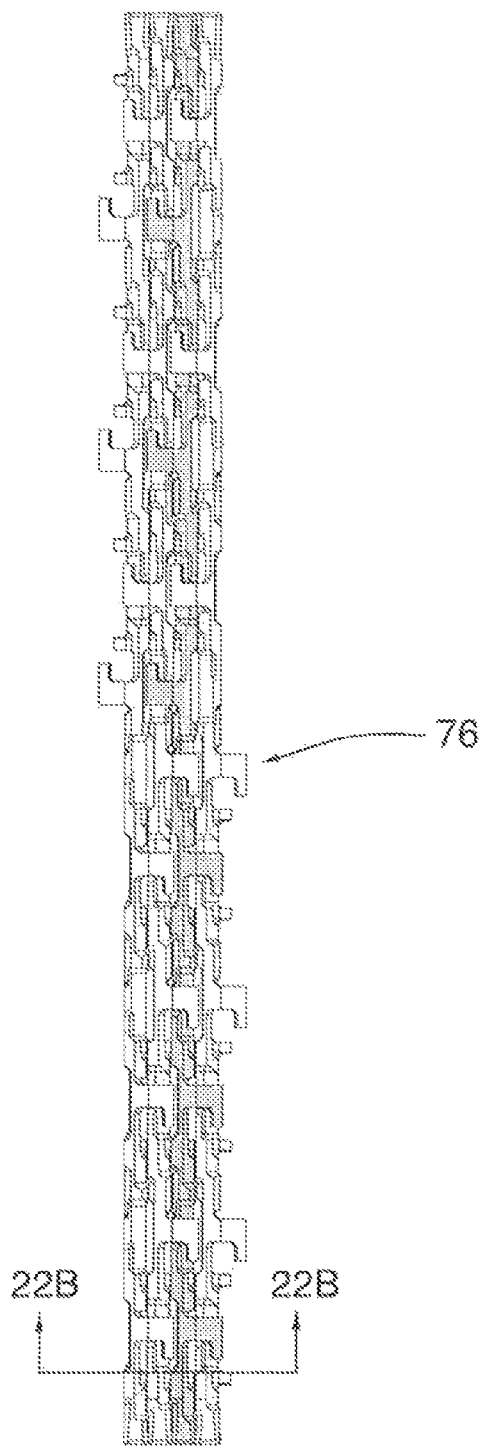
FIG. 19 is a view on B of FIG. 18A showing a portion of the support.
Figure 21:
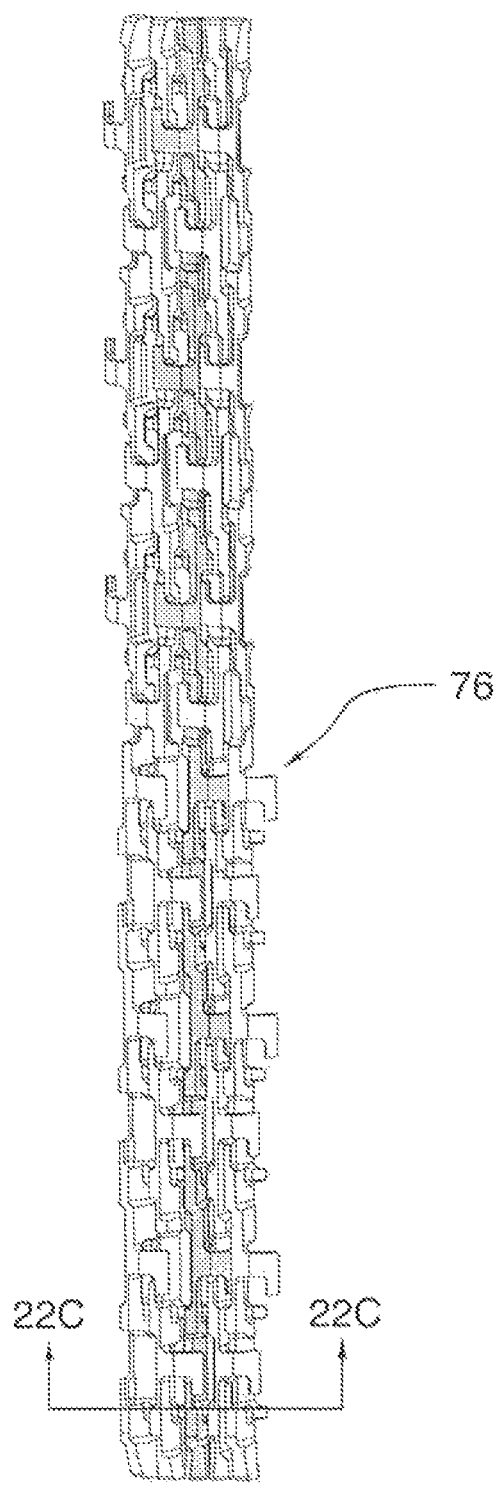
FIG. 21 is a view on C of FIG. 20A showing a portion of the support.
Figure 22A:
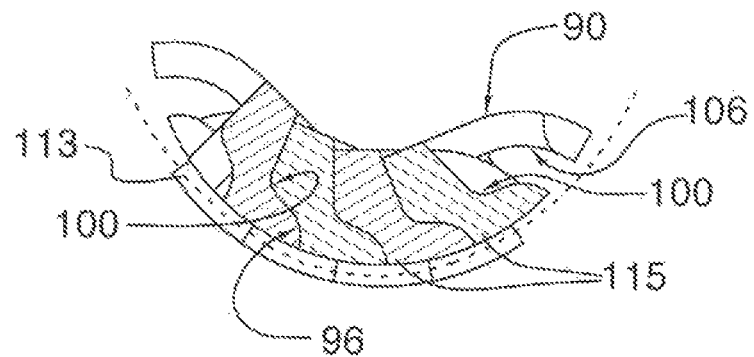
FIG. 22A is a view on 22A-22A of FIG. 17.
Figure 22B:
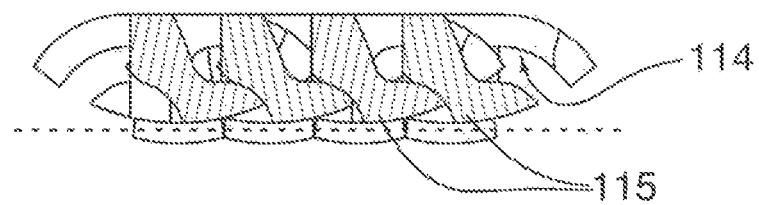
FIG. 22B is a view on 22B-22B of FIG. 19.
Figure 22C:
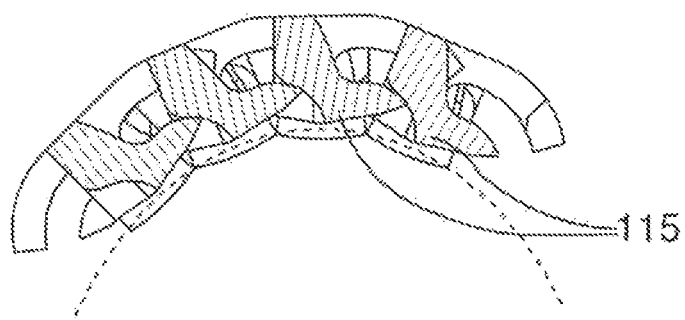
FIG. 22C is a view on 22C-22C of FIG. 21.
Figure 23A:
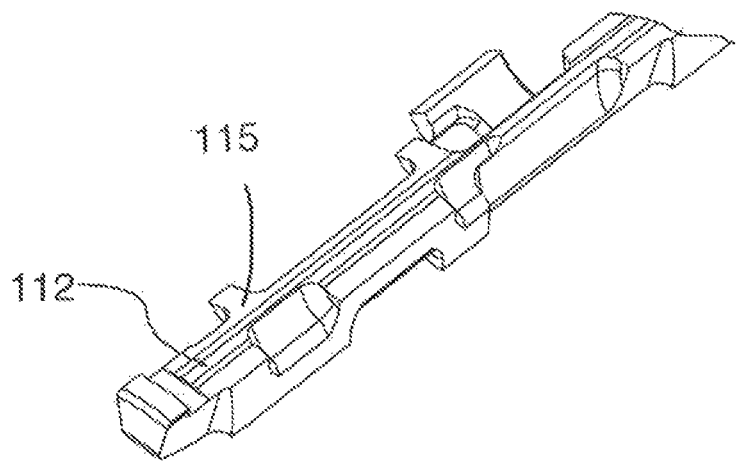
FIG. 23A is an isometric view of a hinge element showing a screen-receiving surface.
Figure 23B:
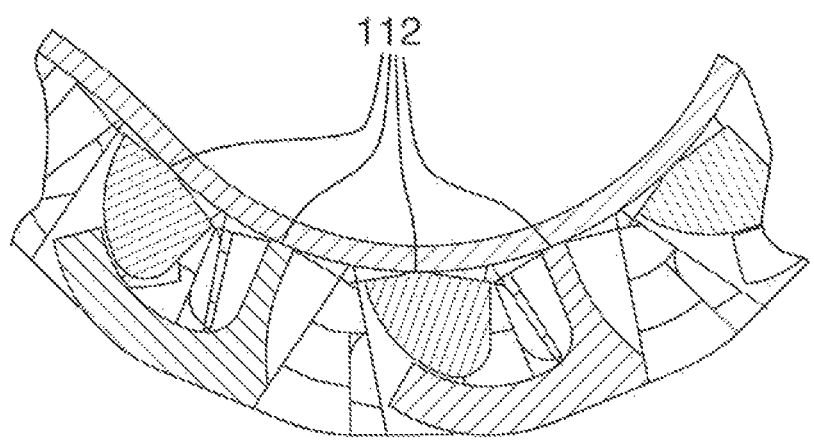
FIG. 23B is a sectional view of a portion of the support showing screen-receiving surfaces.

Movement between the screen external folded position, the starting position and the screen internal folded position will now be described. FIG. 22a is a section on FIG. 17, which depicts four hinge elements in the screen external folded position; FIG. 22b is a section on FIG. 19, which depicts the four hinge elements in the starting position; and FIG. 22c is a section on FIG. 21, which depicts the four hinge elements in the screen internal folded position. Display-receiving surfaces 112, which are shown in FIGS. 23A and 23B, project from a bottom surface 115 of the hinge elements 78 opposite the top surface 84. The display-receiving surfaces 112 extend at least partway along a length of the hinge elements 78. An adhesive (not shown) is used to couple the flexible display (not shown) to the display-receiving surfaces 112. In the screen external folded position of FIG. 22A, the first stop 100 is in abutment with surface 95, which is located above groove 95, to generally prevent further bending movement beyond the screen external folded position. The flexible display may have a thickness that is less than a thickness of display positioning bars 113, which are provided at opposite ends of the support 76 to facilitate location of the flexible display on the support 76 during assembly.

The support 76 unfolds as the portable electronic device 10 is moved from the screen external folded position toward the starting position of FIG. 22B. From the starting position, the portable electronic device 10 may be moved toward the screen external folded position of FIG. 22A or toward the screen internal folded position of FIG. 22C. A portion of the curved projection 86 contacts the groove 96 of an adjacent hinge element 78 through the entire range of motion of the support 76 in order to guide movement of the hinge elements 78 relative to one another. Similarly, an underside surface 114 of the hook-shaped projection 90 continuously contacts the cutout 82 of an adjacent hinge element 78 to guide movement of the hinge elements 78 relative to one another. When moved from the starting position to the screen internal folded position, the underside surface 114 moves relative to the cutout 82 of the adjacent hinge element 78 until the second stop 106 abuts the surface 94 on the first side 88 that is adjacent to the cutout 82. Further movement to bend the screen is generally prevented by the second stop 106.

As shown, the neutral plane, which is identified by the dashed line in FIGS. 22A, 22B and 22C, is located external to the support 76. Because the neutral plane extends generally midway through a thickness of the flexible display 22 throughout the bending range of the support 76, the flexible display 22 is subject to only a small amount of tension or compression on upper and lower surfaces thereof. In general, the amount of tension and compression experienced by the flexible display 22 is not sufficient to cause damage thereto. Similar to the embodiment of FIGS. 3 to 9, movement of one hinge element 54 relative to an adjacent hinge element 54 occurs about a virtual pivot so that a chord length is generally constant as the support moves between the open position and the screen internal folded position. By controlling the path of movement of one hinge element relative to an adjacent hinge element, the support 76 controls a bend radius of the flexible display 22 to protect the flexible display 22 from damage due to over-bending.

The angle at which the hinge elements 78 move relative to one another may be modified in order to accommodate displays 22 having different flexibilities and/or different thicknesses. By adjusting the number of hinge elements 78 and/or adjusting an angle that each pair of adjacent hinge element pair is capable of achieving relative to one another may affect the overall bending capability of the support 76.

Further, the reversed features may be removed and two different hinge elements may be used. Also, the hinge elements 78 may include additional or fewer features than described herein. Any hinge element shape that provides a first stop, a second stop and a guiding element and is capable of controlling bending of a flexible display may be used.

In one embodiment, the hinge elements 78 are capable of moving between the starting position and the screen external folded position only. In another embodiment, the hinge elements 78 are capable of moving between the starting position and the screen internal folded position only. The support 76 may be any size and may be foldable about a length or a width thereof.

Figure 24A:
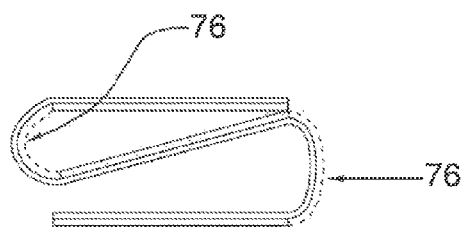
FIG. 24A is a side view of another example portable electronic device in a double folded position.
Figure 24B:
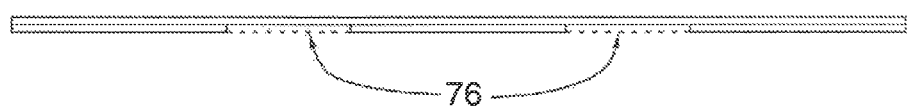
FIG. 24B is a side view of the example portable electronic device in a starting position in which the flexible display is generally flat.

In another embodiment, two or more supports 76 may be provided between three or more housings of the portable electronic device 10. An example in which two supports and three housings are included is shown in FIGS. 24A and 24B.

Figure 25A:
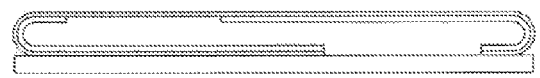
FIGS. 25A and 25B are schematic side views of a portable electronic device including a rolling screen in stowed and extended positions according to an embodiment.
Figure 25B:
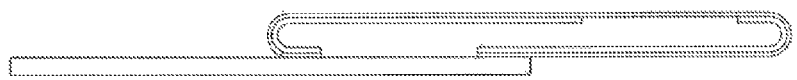
Figure 25C:
FIGS. 25C and 25D are schematic side views of a portable electronic device including a rolling screen in stowed and extended positions according to another embodiment.
Figure 25D:
Figure 25E:
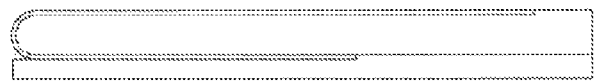
FIGS. 25E and 25F are schematic side views of a portable electronic device including a rolling screen in stowed and extended positions according to yet another embodiment.
Figure 25F:
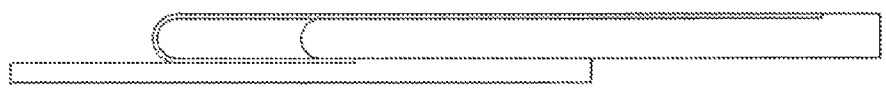

The support 76 may also be used in rolling display embodiments, as shown in FIGS. 25A and 25F. The rolling displays may be used in sliding-type portable electronic devices. In general, the display may be slid or rolled in order to expose a keyboard.

Figure 26A:
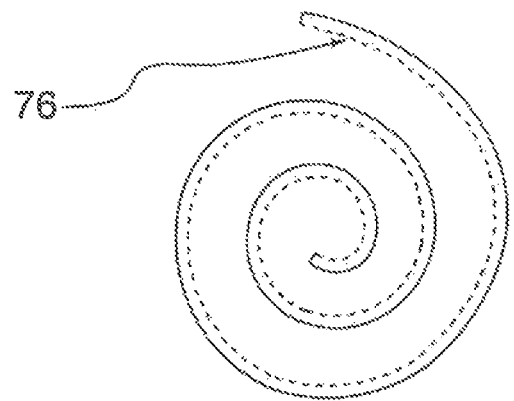
FIG. 26A is a schematic side view of a portable electronic device in a rolled position.
Figure 26B:
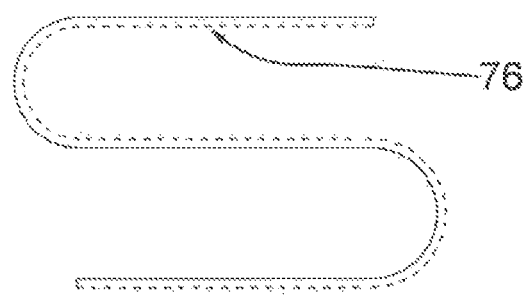
FIG. 26B is a schematic side view of a portable electronic device in a double folded position.

In still another embodiment, the support 76 is sized to engage the entire flexible display 22. By supporting the entire flexible display 22, it may be possible to roll the flexible display 22 into a scroll with the flexible display 22 on an inside or with the flexible display 22 on an outside, as shown in FIG. 26A, or fold the flexible display 22 multiple times in one or both directions, as shown in FIG. 26B, for example.

In the embodiments of FIGS. 10A to 26B, electronics of the portable electronic device 10, including the processor 12, may be provided on a flexible printed circuit board (PCB) located below the flexible display 22. Alternatively, the electronics may be located at a non-flexing end of the portable electronic device 10.

The support 76 of FIGS. 10A to 26B provides a bi-directionally foldable support for the flexible display 22. The support 76 protects the flexible display 22 in order to avoid over-bending and to maintain proper tension on the flexible display 22 when the flexible display 22 is moved between positions. The hinge elements 78 are manufactured to reduce a gap size between hinge element features in order to avoid unsupported portions of the flexible display 22, which may be susceptible to damage when pressed. By reversing the features on each of the hinge elements 78, manufacturing costs may be reduced because the hinge elements 78 include the same features. In addition, the support 76 is capable of resisting twisting forces to provide a structurally sound portable electronic device 10 that may be folded and easily stowed.

Figure 27A:
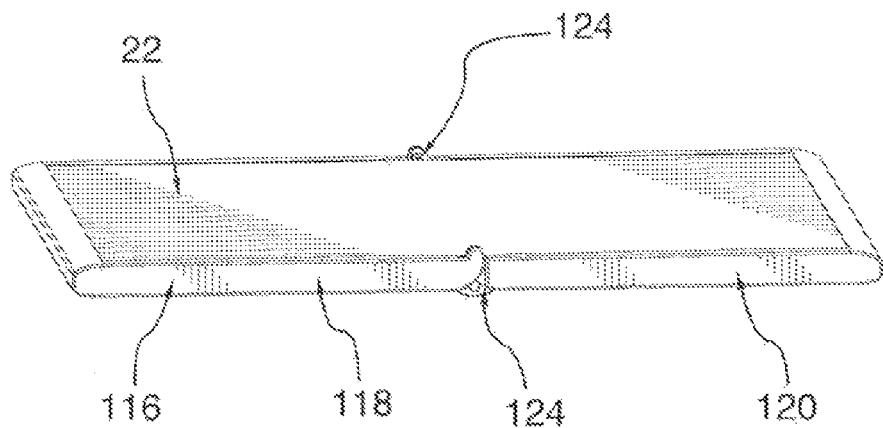
FIG. 27A is an isometric top view of another example portable electronic device in a starting position in which the flexible display is generally flat.
Figure 27B:
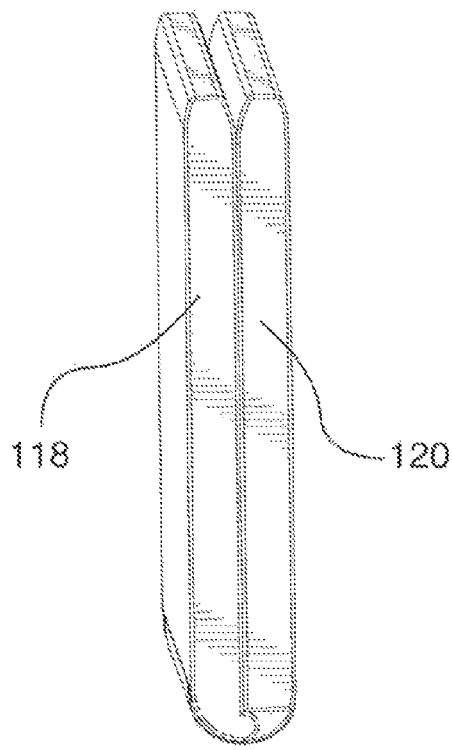
FIG. 27B is an isometric side view of the example portable electronic device in a folded position.

Referring to FIGS. 27A and 27B, another example of a portable electronic device 10 including a flexible display 22 is generally shown. The portable electronic device 10 of FIGS. 27A and 27B is foldable similar to a book, with the flexible display 22 on the inside of a housing 116 of the portable electronic device 10. The housing 116 of the portable electronic device 10 includes a first component 118 that is coupled to a second component 120 by a pivot member 122. As shown, the portable electronic device 10 is movable between an open, or starting, position in which the flexible display 22 is generally flat and a folded position in which the flexible display 22 is hidden.

Figure 28:
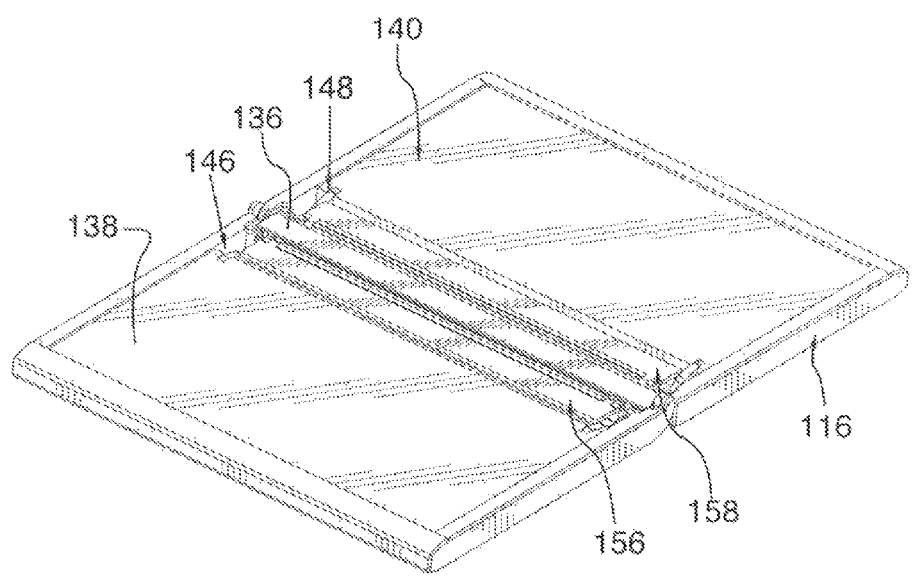
FIG. 28 is a top isometric view of the example portable electronic device of FIG. 27A with the flexible display removed.
Figure 29:
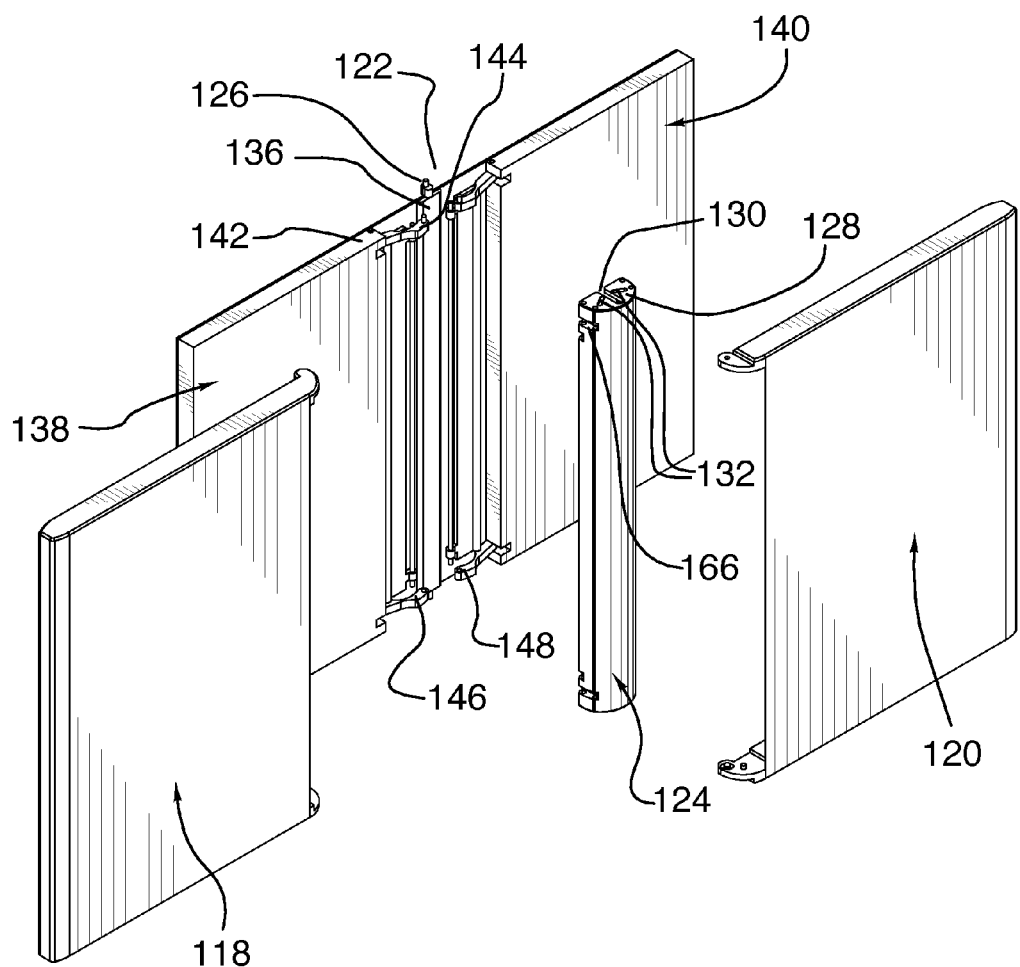
FIG. 29 is an exploded view of the portable electronic device of FIG. 27A.
Figure 30:
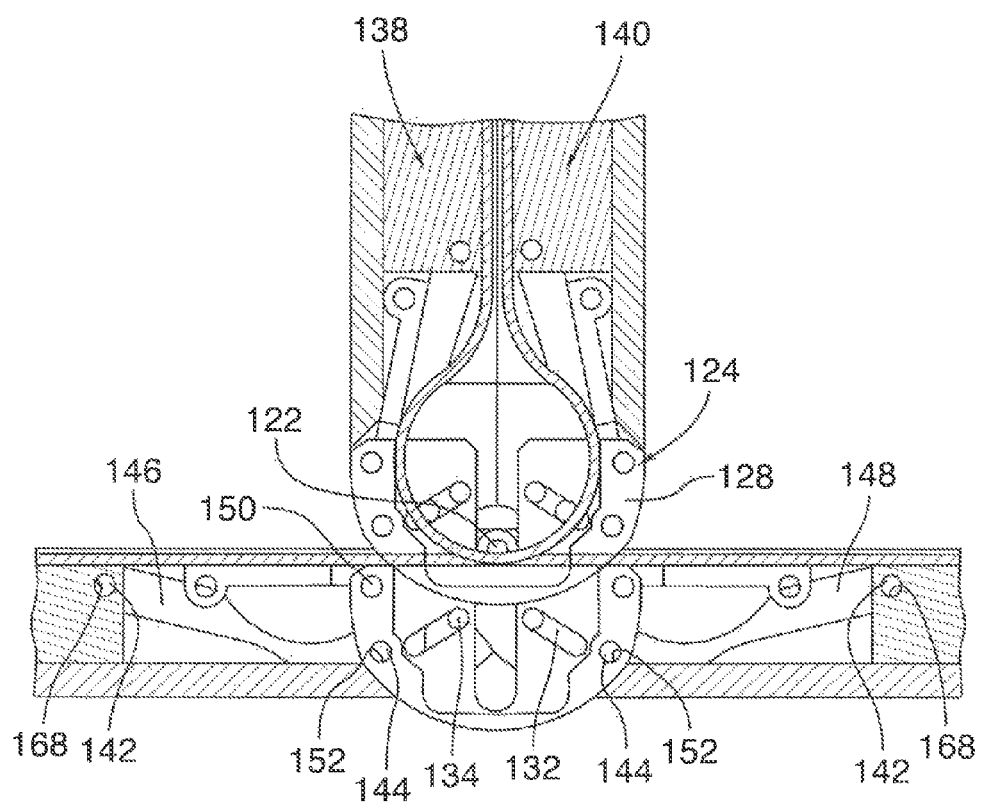
FIG. 30 is a side sectional view of the portable electronic device of FIG. 27A in the starting position and the folded position.

Referring also to FIGS. 28, 29 and 30, a pivot support 124 is coupled between a first slider 138 and a second slider 140 by a first slider linkage 146 and a second slider linkage 148, as shown, and is movable relative to the housing 116 and the pivot member 122. The first slider 138 is slidably received in the first component 118 of the housing 116 and the second slider 140 is slidably received in the second component 120 of the housing 116. The pivot support 124 includes a channel that extends between a pair of semi-circular ends 128 having openings 130 through which the pivot member 122 and connecting portions 126 of a central screen support 136 extend.

The pivot support 124 includes linkage openings 166 located adjacent to the ends 128 for receiving the slider linkages 146, 148. Pins 142, 144 extend from opposite ends of the slider linkages 146, 148 to couple the slider linkages 146, 148 to apertures 168 of the sliders 138, 140 and apertures 152 that are located in the ends 128 of the pivot support 214, respectively. Slots 132 are located on either side of the openings 130 for receiving pins 134, which extend from the first component 118 and the second component 120.

When the portable electronic device 10 is assembled, the flexible display 22 is coupled to the sliders 138, 140 and the central screen support 136. Additional screen supports 156, 158 are located on either side of the central screen support 136. The additional supports 156, 158 are mounted on rods 154 that are received through apertures 150 of the pivot support 124. The additional supports 156, 158 provide support for the flexible display 22 when the portable electronic device 10 is in the starting position. The flexible display 22 is not coupled to the additional screen supports 156, 158.

Figure 31A:
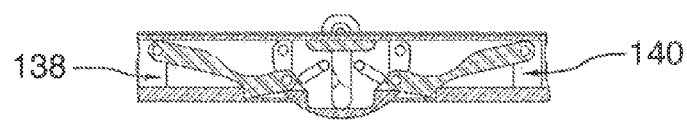
FIGS. 31A to 31E are side sectional views of portions of the portable electronic device of FIG. 27A in different positions.
Figure 31B:
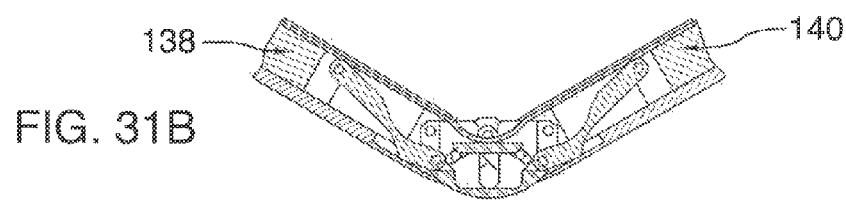
Figure 31C:
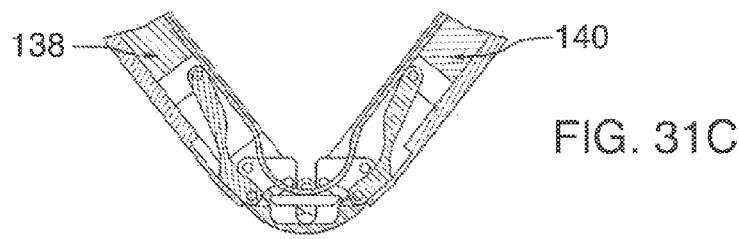
Figure 31D:
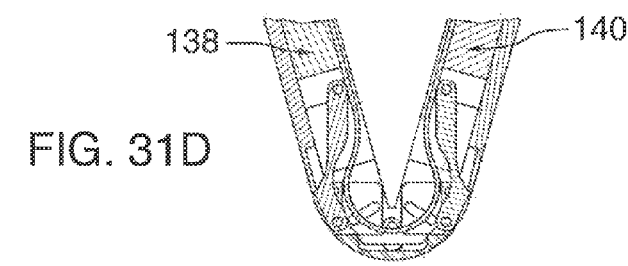
Figure 31E:
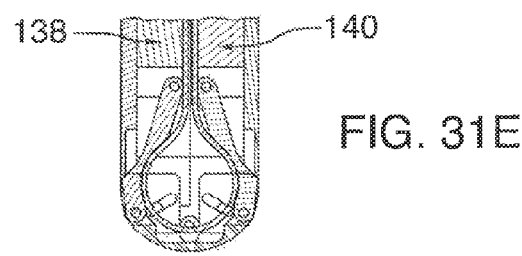

Operation of the portable electronic device 10 will now be described with reference to FIGS. 31A to 31E. The portable electronic device 10 is movable from the open position of FIG. 31A, in which the first component 118 and the second component 120 of the housing 116 are generally in the same plane, towards the folded position. As the first component 118 and the second component 120 are moved toward one another, the pins 134 move in the slots 132 of the pivot support 124. Movement of the pins 134 in the slots 132 forces the pivot member 122 and the central screen support 136 to move toward an end of the opening 130, as shown in FIGS. 31B to 31D. The slider linkages 146, 148 rotate relative to the pivot support 124, which causes the sliders 138, 140 to move relative to the housing 116. Movement of the sliders 138, 140 and the central screen support 136 results in the flexible display taking the shape that is shown in FIG. 31E.

Figure 33:
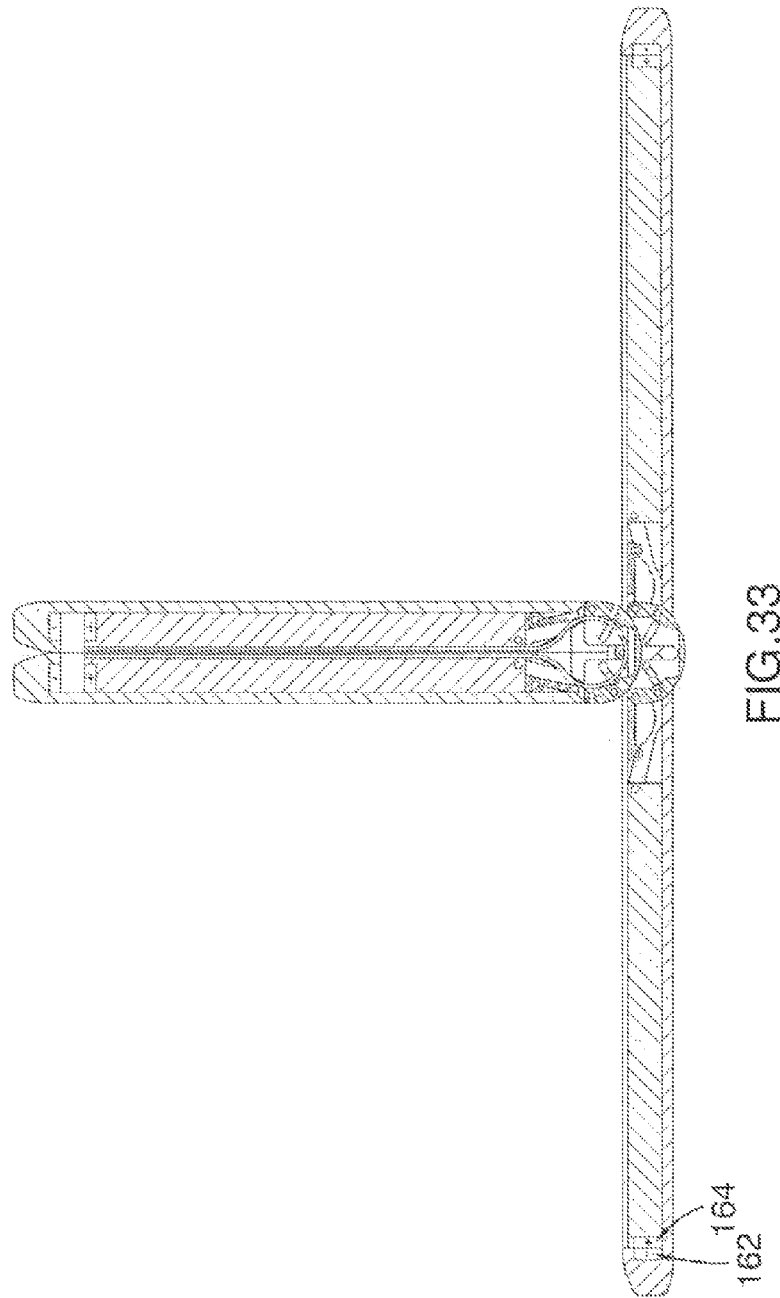
FIG. 33 is a side sectional view of still another example portable electronic device in the starting position and the folded position.

Another embodiment of a portable electronic device 10 is shown in FIG. 32 in which springs 160 are located between the first component 118 and the first slider 138 and the second component 120 and the second slider 140, as shown, to facilitate movement of the sliders 138, 140 and ensure proper tension of the flexible display 22 when the portable electronic device is in the open position. Similarly, another embodiment of a portable electronic device 10 is shown in FIG. 33 in which magnet pairs 162, 164 are located between the first component 118 and the first slider 138 and the second component 120 and the second slider 140, as shown, to facilitate movement of the sliders 138, 140 and ensure proper tension of the flexible display 22 when the portable electronic device 10 is in the open position.

In the embodiments of FIGS. 27A to 33, electronics of the portable electronic device 10, including the processor 12, may be provided on a flexible printed circuit board (PCB) located below the flexible display 22 or cables may extend through the pivot support 124 between electronics of the first component 118 and the second component 120 of the housing 116 of the portable electronic device 10.

Figure 34A:
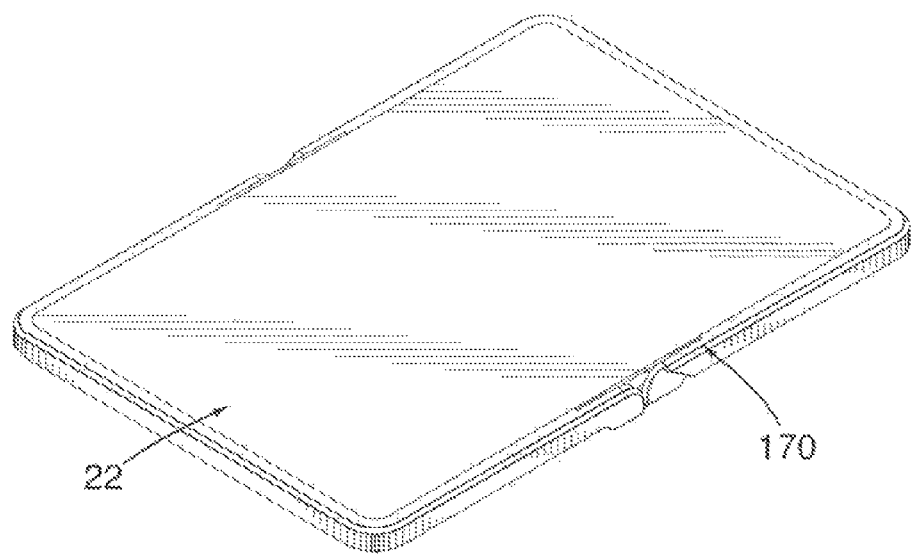
FIG. 34A is a top isometric view of another example portable electronic device in a starting position in which the flexible display is generally flat.
Figure 34B:
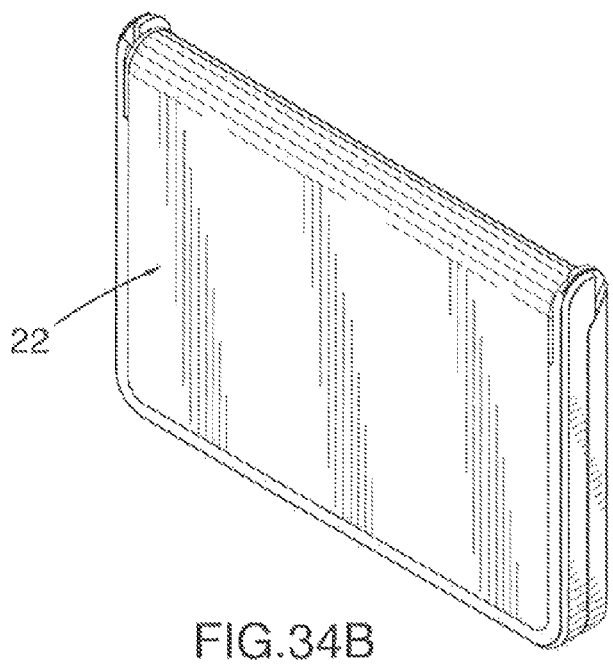
FIG. 34B is a top isometric view of the example portable electronic device of FIG. 34A in a folded position.

Referring to FIGS. 34A and 34B, another example of a portable electronic device 10 including the flexible display 22 is generally shown. The portable electronic device 10 of FIGS. 34A and 34B is foldable similar to a book, with the flexible display 22 on the outside. As shown, the portable electronic device 10 is movable between an open, or starting, position in which the flexible display 22 is generally flat and a folded position in which the flexible display 22 is located on an outside of a housing 170.

Figure 35:
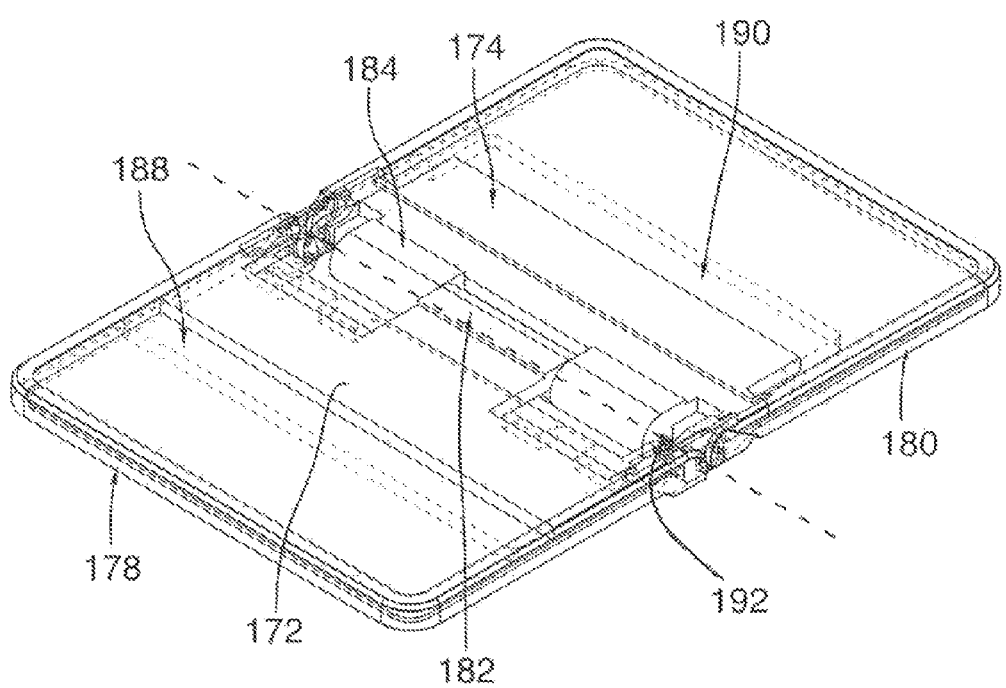
FIG. 35 is a top isometric view of portions of the example portable electronic device of FIG. 34A.
Figure 36:
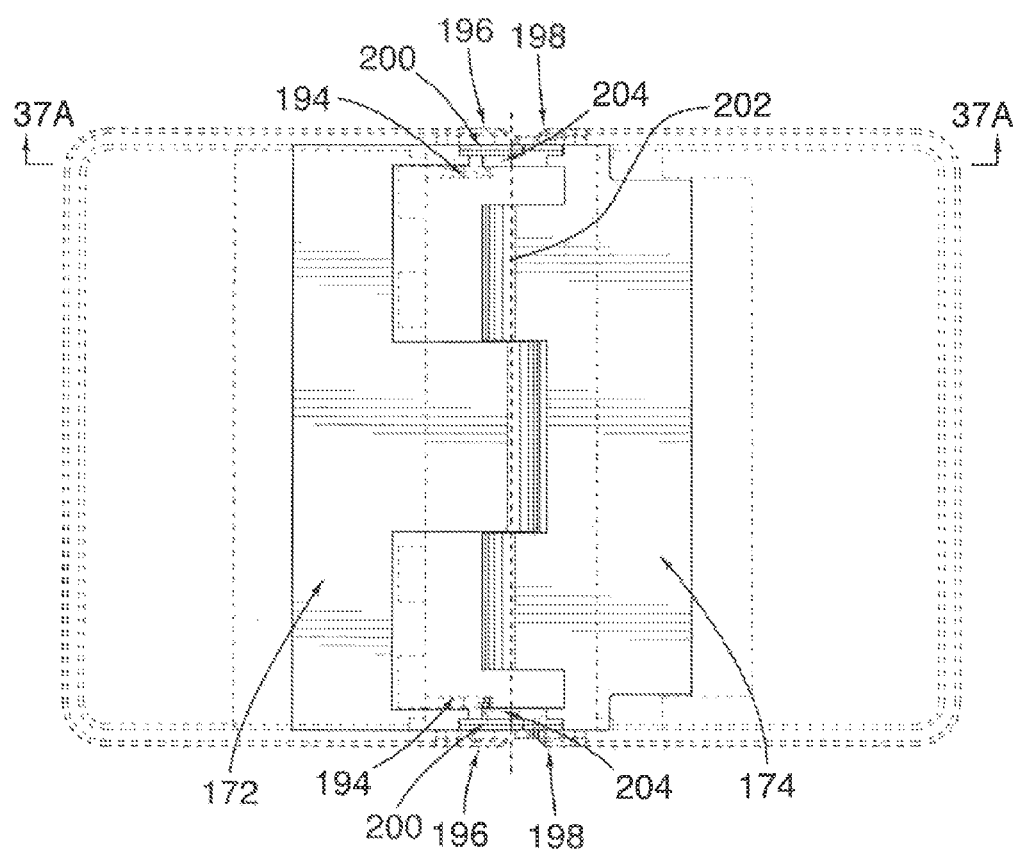
FIG. 36 is a top view of portions of the example portable electronic device of FIG. 34A.

Referring to FIGS. 35 and 36, the portable electronic device 10 includes a first component 172 and a second component 174. The first component 172 is coupled to the second component by a pivot member 192 that extends through a first hinge knuckle 182 of the first component 172 and a pair of second hinge knuckles 184 of the second component 174. The second hinge knuckles 184 are located on either side of the first hinge knuckle 182 and aligned therewith to receive the pivot member.

Figure 37A:
FIG. 37A is a view on 37A-37A of FIG. 36 with the portable electronic device in the starting position.
Figure 37B:
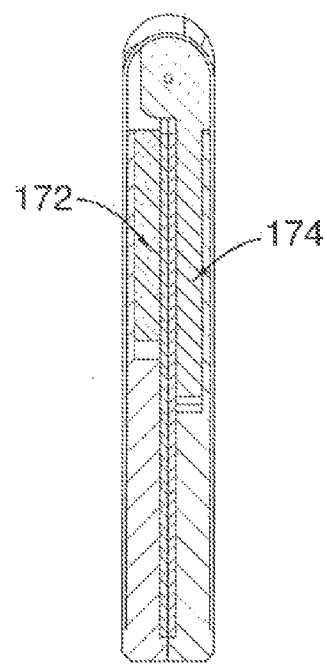
FIG. 37B is a view similar to FIG. 37A with the portable electronic device in the folded position.

A first slider 178 includes a first cavity 188, which receives the first component 172 and a second slider 180 includes a second cavity 190, which receives the second component 174. The cavities 188, 190 are sized to accommodate movement of the sliders 178, 180 relative to the components 172, 174. As shown in FIG. 37A, when the portable electronic device 10 is in the starting position, gaps exist between the components 172, 174 and ends of the cavities 188, 190. When the portable electronic device 10 is in the folded position, the gaps are significantly reduced, as shown in FIG. 37B.

Referring still to FIG. 36, the first component 172 includes first guide arms 200, which extend from ends of the first component 172 toward an axis 202 of the pivot member, and the second component 174 includes second guide arms 204, which extend from ends of the second component 174 toward the axis 202 of the pivot member. The first guide arms 200 are located outside of the second guide arms 204 and the guide arms 200 and 204 are coupled to one another by a pin (not shown) that extends through aperture 206 of first guide arm 200 (shown in FIG. 40B) and aperture 208 of second guide arm 204 (shown in FIG. 39B). An outer connecting arm 196 partially overlaps a connecting arm 198 of the second component 174 so that sides of the first slider 178 and the second slider 180 are generally aligned.

The first slider 178 includes an inner pair of connecting arms 194 that are coupled to the second component 174 and an outer pair of connecting arms 196 that are provided as a cover. The second slider 180 includes a pair of connecting arms 198 that are coupled to the first component 172. The outer pair of connecting arms 196 of the first slider 178 are shaped to overlap a reduced thickness portion of the connecting arms 198 of the second slider 180 when the portable electronic device 10 is moved from the starting position to the folded position.

Figure 38A:
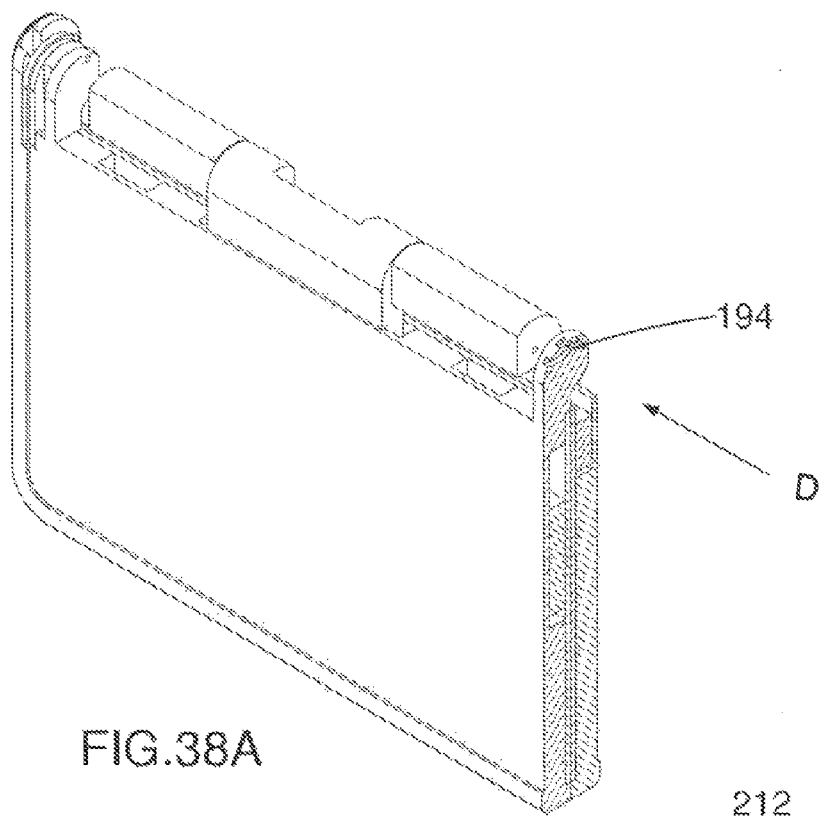
FIG. 38A is an isometric view of portions of the example portable electronic device of FIG. 34A in the folded position.
Figure 38B:
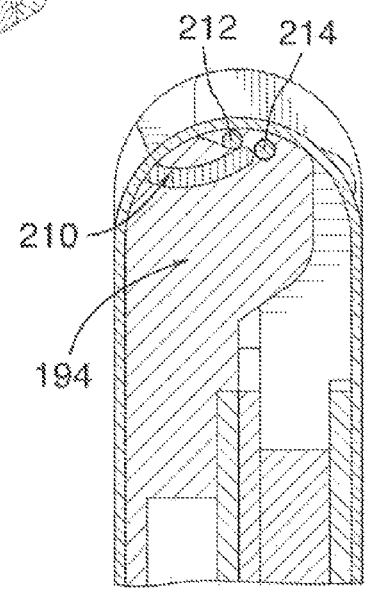
FIG. 38B is a view on D of FIG. 38A.
Figure 39A:
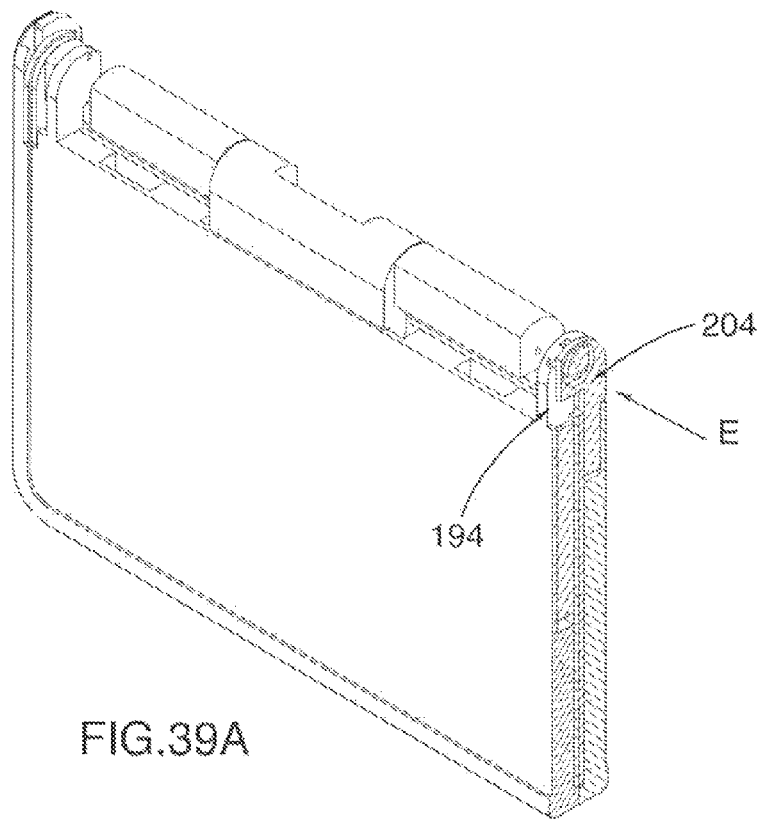
FIG. 39A is an isometric view of portions of the example portable electronic device of FIG. 34A in the folded position.
Figure 39B:
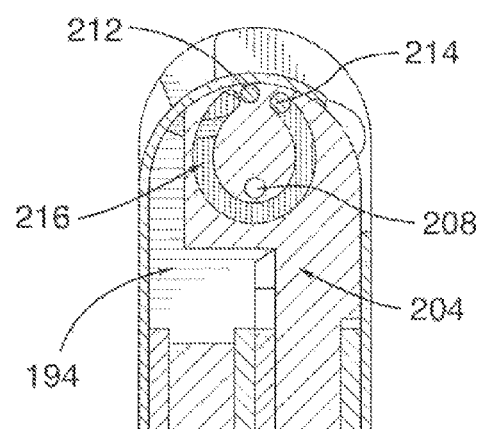
FIG. 39B is a view on E of FIG. 39A.

Referring to FIGS. 38A and 38B, the inner connecting arms 194 include first slider guide grooves 210. Pins 212, which extend from the second guide arms 204, are received in the first slider guide grooves 210. Pins 214 extend outwardly from the inner connecting arms 194 and are received in second component guide grooves 216, as shown in FIGS. 39A and 39B.

Figure 40A:
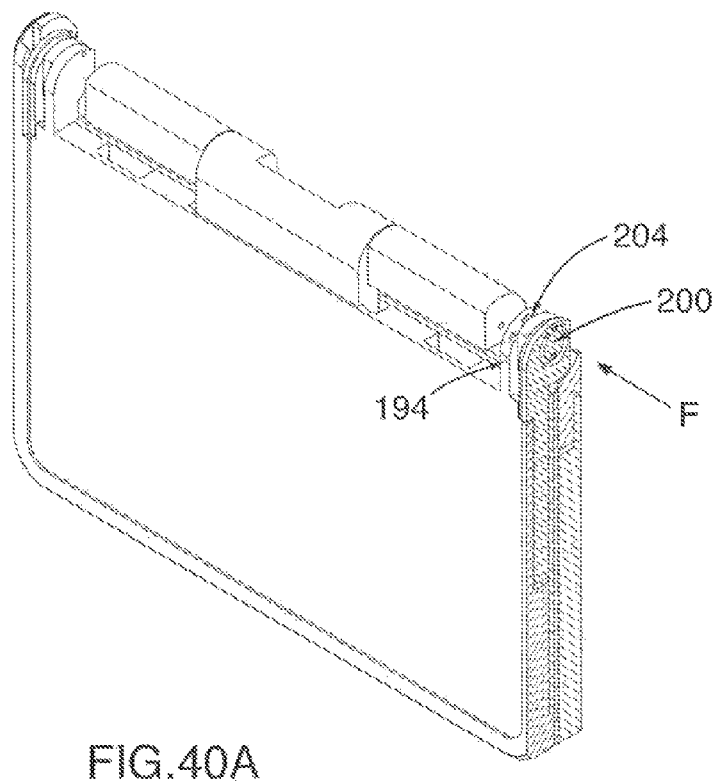
FIG. 40A is an isometric view of portions of the example portable electronic device of FIG. 34A in the folded position.
Figure 40B:
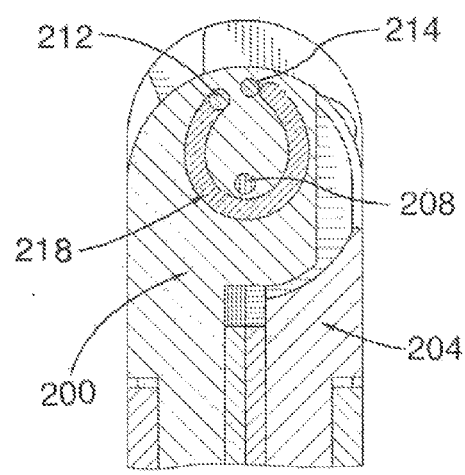
FIG. 40B is a view on F of FIG. 40A.
Figure 41A:
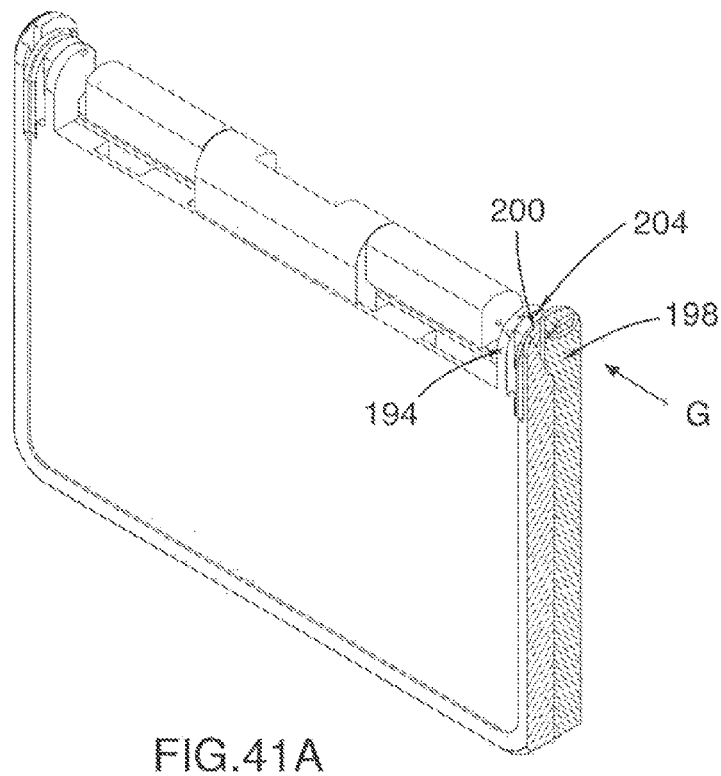
FIG. 41A is an isometric view of portions of the example portable electronic device of FIG. 34A in the folded position.
Figure 41B:
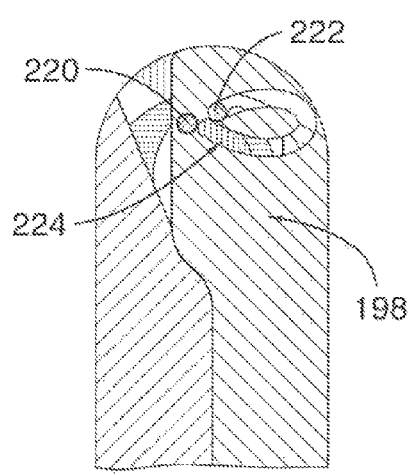
FIG. 41B is a view on G of FIG. 41A.
Figure 42A:
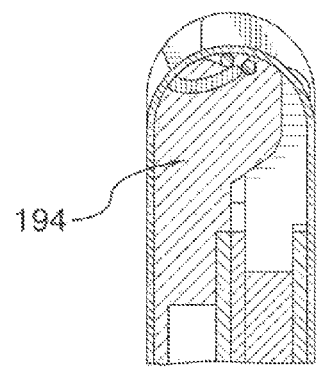
FIGS. 42A, 42B, 42C and 42D are views on D, E, F and G of FIGS. 38A, 39A, 40A and 41A, respectively, showing portions of the portable electronic device in the folded position.
Figure 42B:
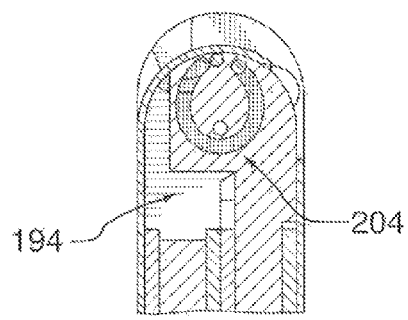
Figure 42C:
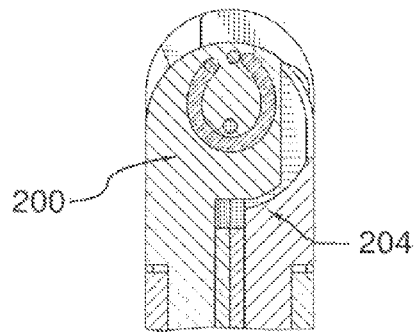
Figure 42D:
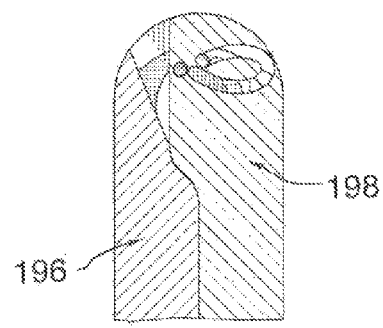
Figure 43A:
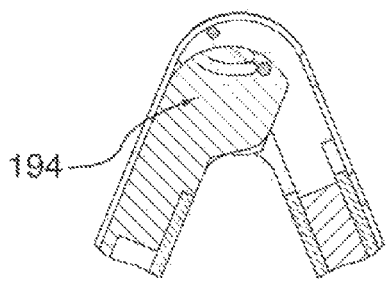
FIGS. 43A, 43B, 43C and 43D are views on D, E, F and G of FIGS. 38A, 39A, 40A and 41A, respectively, showing portions of the portable electronic device in a partially open, or partially folded, position.
Figure 43B:
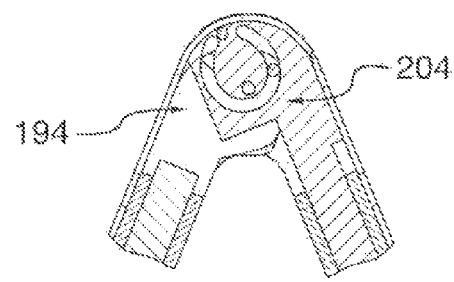
Figure 43C:
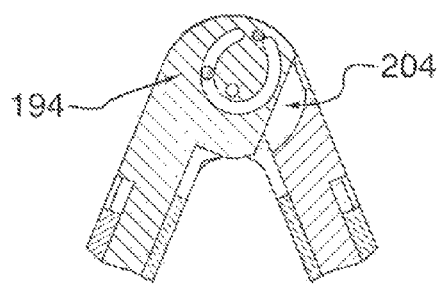
Figure 43D:
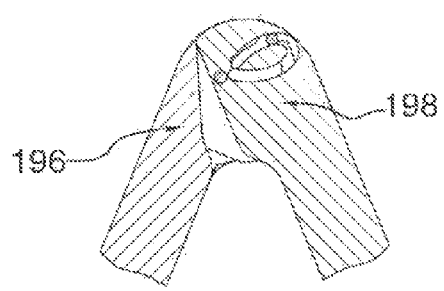
Figure 44A:
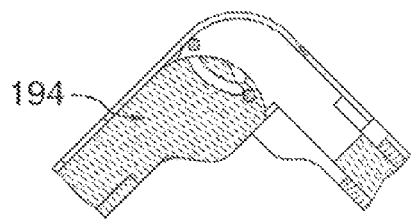
FIGS. 44A, 44B, 44C and 44D are views on D, E, F and G of FIGS. 38A, 39A, 40A and 41A, respectively, showing portions of the portable electronic device in another partially open position.
Figure 44B:
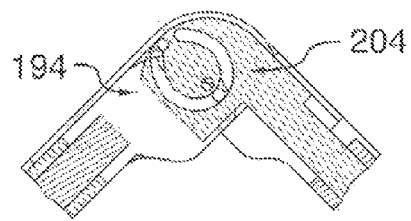
Figure 44C:
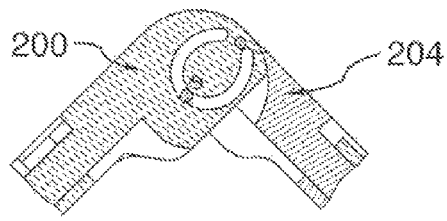
Figure 44D:
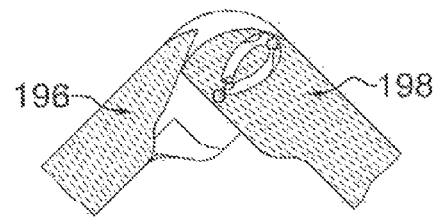
Figure 45A:
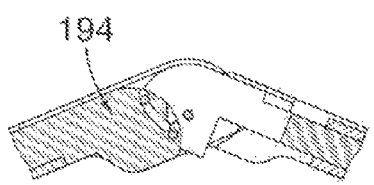
FIGS. 45A, 45B, 45C and 45D are views on D, E, F and G of FIGS. 38A, 39A, 40A and 41A, respectively, showing portions of the portable electronic device in another partially open position.
Figure 45B:
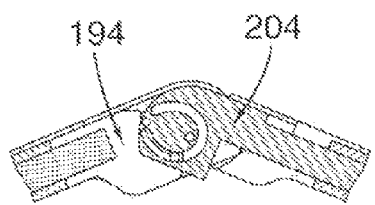
Figure 45C:
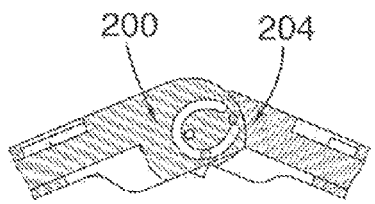
Figure 45D:
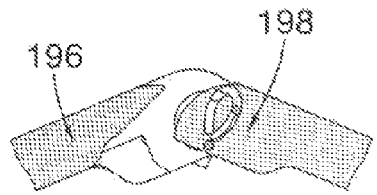
Figure 46A:
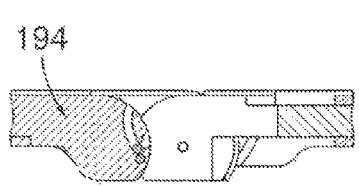
FIGS. 46A, 46B, 46C and 46D are views on D, E, F and G of FIGS. 38A, 39A, 40A and 41A, respectively, showing portions of the portable electronic device in the starting position.
Figure 46B:
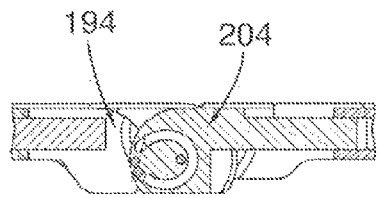
Figure 46C:
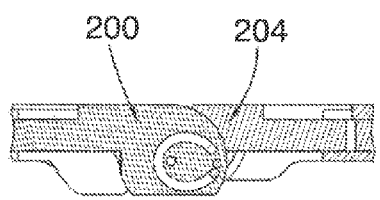
Figure 46D:
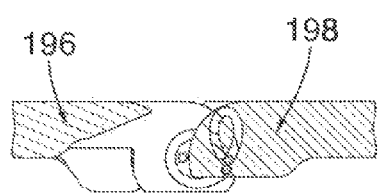

Referring to FIGS. 40A and 40B, the guide arms 200 include a first component guide groove 218. Pins 220, which extend from the connecting arms 198 of the second slider 180, are received in the first component guide groove 218. Pins 222 extend outwardly from the guide arms 200 of the first component 172 and are received in second slider guide grooves 224, as shown in FIGS. 41A and 41B.

In operation, the inner connecting arms 194 of the first slider 178 move relative to the guide arms 204 of the second component 174 and the connecting arms 198 of the second slider 180 move relative to guide arms 200 of the first component 172 when the housing 170 of the portable electronic device 10 is moved between the open position and the folded position. With reference to FIGS. 42A to 46D, the portable electronic device 10 is moved from the starting position of FIGS. 42A to 42D toward the folded position. As the first component 172 and the second component 174 are moved toward one another, the pins 212, 214, 220, 222 move in the respective guide grooves 210, 216, 218, 224, as shown. While the first component 172 and the second component 174 pivot about the pivot member, the first slider 178 and the second slider 180 move relative to the first and second components 172, 174, respectively. This movement maintains the length of the flexible display 22 so that the flexible display is under generally even tension. Both stretching of the flexible display 22 when the portable electronic device 10 is moved to the folded position and/or bunching of the flexible display 22 when the portable electronic device 10 is moved to the starting position are avoided.

In order to achieve the movement of the sliders 178, 180 relative to the components 172, 174 required to maintain the flexible display at a constant length when moved between the starting position and the folded position, one of the pins 212, 214, 220, 222 may exit the respective guide grooves 210, 216, 218, 224 at a given time.

Figure 47:
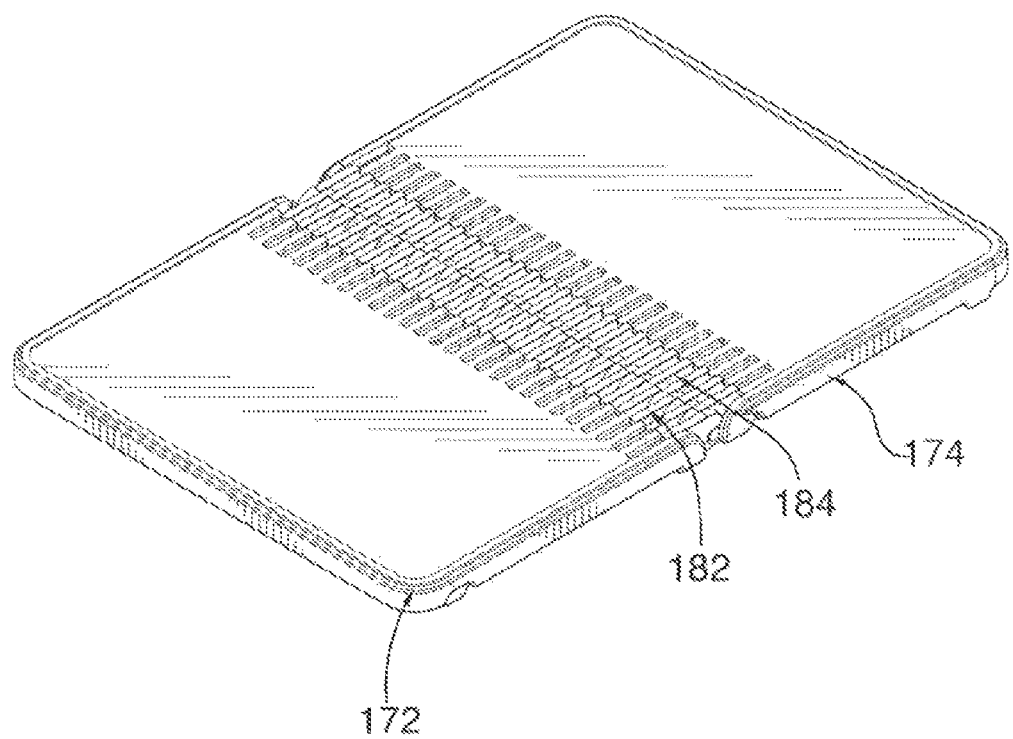
FIG. 47 is an isometric view of another example portable electronic device.

Referring to FIG. 47, another embodiment of a portable electronic device 10 is shown. In this embodiment, multiple first hinge knuckles 182 and second hinge knuckles 184 mesh to couple the first component 172 and second component 174 to one another and reduce a gap size between components, so that the user may detect a generally continuous support surface below the flexible display 22.

In the embodiments of FIGS. 34A to 47, electronics of the portable electronic device 10, including the processor 12, may be provided on a flexible printed circuit board (PCB) located below the flexible display 22. Alternatively, the electronics may be provided within the sliders 178, 180 or other components of the portable electronic device 10. Electronics may be electrically coupled by flexible circuits.

It will be appreciated that although a flexible display is described, any flexible membrane such as a flexible whiteboard or a flexible tablet cover, for example, may be supported by any of the support embodiments described herein. When the flexible membrane does not require electronic components in order to operate, the support may be provided without accompanying portable electronic device components.

Many of the elements described herein can be expressed in more generic terms according to the function of those elements. For example, those structures or elements that couple the flexible display to the hinge elements, alone or in any combination, may be deemed to be means for coupling the flexible display to the hinge elements. Similarly, any structures that carry out the function of physically coupling hinge elements to one another may be deemed to be means for coupling the hinge elements to one another, and any structures that carry out the function of limiting movement of the hinge elements relative to adjacent hinge elements may be deemed to be means for limiting movement of the hinge elements relative to adjacent hinge elements, and so on.

Implementation of one or more embodiments may realize one or more benefits, some of which have already been mentioned. Being able to fold a flexible screen without damaging the screen may, for example, enhance portability and protect the screen from damage or contaminants. The concepts described herein are widely adaptable to a variety of electronic devices of different shapes and sizes, as well as to many kinds of flexible displays and different configurations of electronics. Many of the components can be constructed from any number of materials (including but not limited to metals and plastics) and can securely and robustly support a flexible screen with a reasonable size and weight. Further, bending of different kinds, bending in different directions and bending of different extents can be enabled or restricted, and the flexible screen may be supported in a number of useful configurations.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A device comprising:

a housing having a first component and a second component coupled to one another by a pivot member and movable relative to one another between an open position in which the first component and the second component are in the same plane and a folded position;

a first slider slidably received in the first component and a second slider slidably received in the second component, the first slider and the second slider being movable toward the pivot member when the first component and the second component move from the open position to the folded position;

a flexible membrane coupled to the first slider, the second slider and a central screen support, the central screen support coupled between the pivot member and the flexible membrane; and a pivot support comprising a channel extending between a pair of ends, the ends comprising openings for receiving the pivot member, slots located on either side of the openings for receiving pins extending from the first component and the second component and apertures for receiving pins of a first slider linkage and a second slider linkage, the first slider linkage pivotally coupling the first slider to the pivot support and the second slider linkage pivotally coupling the second slider to the pivot support;

wherein, when the first component and the second component are moved toward the folded position in which the flexible membrane is located between the first component and the second component, the pins move in the slots and force the pivot member toward an end of the opening to move the central screen support into the channel of the pivot support.

2. A device as claimed in claim 1, wherein the slider linkages are movable in response to movement of the pivot support.

3. A device as claimed in claim 2, wherein the slider linkages coupling the first slider and the second slider to the pivot support are pivotable about the pins.

4. A device as claimed in claim 1, wherein the flexible membrane is a flexible display screen.

5. A device as claimed in claim 4, comprising a processor in electrical communication with the flexible display screen and a power pack.

6. A device as claimed in claim 1, wherein the flexible membrane is a flexible touch-sensitive display screen.

7. A device as claimed in claim 6, comprising a processor in electrical communication with the flexible touch-sensitive display screen and a power pack.

8. A device as claimed in claim 1, wherein a distance between the first slider and the pivot member and a distance between the second slider and the pivot member are reduced when the first component and second component are moved toward the folded position.

9. A device as claimed in claim 1, comprising screen supports located between the first slider and the central screen support and the second slider and the central screen support, the screen supports supporting the flexible membrane when the first component and the second component are in the open position.

10. A device as claimed in claim 1, wherein the flexible membrane is coupled to the first slider, the second slider and the pivot member by an adhesive.

\* \* \* \* \*